(12) United States Patent
Aupperlee et al.

(10) Patent No.: US 7,904,181 B2
(45) Date of Patent: Mar. 8, 2011

(54) MODEL FOR COMMUNICATION BETWEEN MANUFACTURING AND ENTERPRISE LEVELS

(75) Inventors: Eric Aupperlee, Boca Raton, FL (US); Sunil Barboza, Boca Raton, FL (US); David De La Rosa, Boca Raton, FL (US); John Keever, Boca Raton, FL (US); Jim Wert, Boca Raton, FL (US); Terry Zanzucchi, Delray Beach, FL (US)

(73) Assignee: ILS Technology LLC, Boca Raton, FL (US)

( * ) Notice: Subject to any disclaimer, the term of this patent is extended or adjusted under 35 U.S.C. 154(b) by 1306 days.

(21) Appl. No.: 11/142,200

(22) Filed: Jun. 1, 2005

(65) Prior Publication Data

US 2005/0267882 A1    Dec. 1, 2005

Related U.S. Application Data

(60) Provisional application No. 60/575,362, filed on Jun. 1, 2004.

(51) Int. Cl.
*G05B 15/00* (2006.01)
*G05B 19/42* (2006.01)
*G05B 23/02* (2006.01)
*G06F 19/00* (2006.01)
*G06F 17/30* (2006.01)
*G08B 23/00* (2006.01)
*G06Q 20/00* (2006.01)

(52) U.S. Cl. .......... 700/1; 700/83; 700/174; 705/63; 340/3.9; 340/573.3

(58) Field of Classification Search ............. 700/1, 174, 700/83; 707/102; 705/63; 340/3.9, 573.3
See application file for complete search history.

(56) References Cited

U.S. PATENT DOCUMENTS 5,038,318 A    8/1991   Roseman
5,245,704 A *  9/1993   Weber et al. .......... 709/215

(Continued)

FOREIGN PATENT DOCUMENTS

WO    WO 01/33759 A1    5/2001

(Continued)

OTHER PUBLICATIONS

Yates et al., "The Parlay Network API Specification" BT Technology, Apr. 2000 p. 57-64.*

(Continued)

*Primary Examiner* — Albert Decady
*Assistant Examiner* — Tom Stevens
(74) *Attorney, Agent, or Firm* — Buchanan Ingersoll & Rooney PC

(57) ABSTRACT

A device for communicating with low level controllers and sensors located on the production floor of an enterprise directly from the top level of the enterprise. The device comprises a controller which interfaces with programmable logic controllers (PLCs) via the backplane into which the PLCs are plugged. Users are able to define triggers that specify the circumstances under which data points within the PLCs are transported to the enterprise level where they may be stored in a database or sent directly to enterprise application via one of a number of possible transfer protocols. The invention also includes a software client which allows users to set up transfer triggers and view data points on the PLCs in real time.

45 Claims, 21 Drawing Sheets

U.S. PATENT DOCUMENTS

| | | | |
|---|---|---|---|
| 5,307,346 A * | 4/1994 | Fieldhouse | 370/254 |
| 5,473,757 A * | 12/1995 | Sexton | 700/2 |
| 5,555,504 A * | 9/1996 | Lepper et al. | 700/115 |
| 5,729,067 A * | 3/1998 | Janutka | 310/135 |
| 6,108,662 A | 8/2000 | Hoskins et al. | |
| 6,175,765 B1 * | 1/2001 | Sullivan et al. | 607/5 |
| 6,252,363 B1 * | 6/2001 | Grady | 318/266 |
| 6,268,853 B1 * | 7/2001 | Hoskins et al. | 700/83 |
| 6,282,498 B1 * | 8/2001 | Tamaki et al. | 702/44 |
| 6,373,389 B1 * | 4/2002 | Przygoda et al. | 340/572.4 |
| 6,401,081 B1 | 6/2002 | Montgomery et al. | |
| 6,480,896 B1 | 11/2002 | Brown et al. | |
| 6,684,121 B1 * | 1/2004 | Lu et al. | 700/108 |
| 6,751,653 B2 * | 6/2004 | Austin | 709/217 |
| 6,757,714 B1 | 6/2004 | Hansen et al. | |
| 6,760,782 B1 * | 7/2004 | Swales | 709/250 |
| 6,840,086 B2 | 1/2005 | McCoy et al. | |
| 6,853,867 B1 * | 2/2005 | Klindt et al. | 700/83 |
| 7,062,335 B2 * | 6/2006 | Klindt et al. | 700/83 |
| 2001/0020195 A1 | 9/2001 | Patel et al. | |
| 2001/0054044 A1 | 12/2001 | Liu et al. | |
| 2002/0022969 A1 | 2/2002 | Berg et al. | |
| 2002/0029086 A1 | 3/2002 | Ogushi et al. | |
| 2002/0046221 A1 * | 4/2002 | Louis Wallace et al. | 707/513 |
| 2002/0077981 A1 | 6/2002 | Takatori et al. | |
| 2002/0128988 A1 * | 9/2002 | Covington et al. | 705/413 |
| 2003/0014500 A1 * | 1/2003 | Schleiss et al. | 709/218 |

FOREIGN PATENT DOCUMENTS

WO    WO 01/38995 A1    5/2001

OTHER PUBLICATIONS

Neuhaus et al., Validation of the Process Control System of an Automated Large Scale Manufacturing Plant', 1997, Elsevier, p. 333-342.*

* cited by examiner

MODEL FOR COMMUNICATION BETWEEN MANUFACTURING AND ENTERPRISE LEVELS

RELATED APPLICATIONS

This application claims the benefit of U.S. Provisional Application Ser. No. 60/575,362, filed Jun. 1, 2004.

BACKGROUND OF THE INVENTION

It is common, in manufacturing facilities, to find automated processes controlled by low level automation and process control and monitoring systems. Low level automation systems may include, for example, dedicated robotic devices or other automated systems controlled or monitored by programmable logic controllers (PLC's). Various sensing devices and instrumentation may also be used to monitor the processes, such as photo eyes, barcode readers and temperature sensors. To manage the plethora of complex manufacturing and assembly systems used today, many enterprises use a multi-tiered architecture, such as the prior art example shown in FIG. 1. A conventional multi-tiered architecture may include: enterprise level business planning systems (enterprise resource planning, or ERP) 102; operations level (manufacturing execution systems, or MES) 104; mid-level process optimization systems 106 (e.g. human machine interface (HMI), supervisory control and data acquisition (SCADA), viewable plant floor status, data collection for upstream reporting); and low level process automation or controls systems 108, including sensors or other instrumentation 110.

Many customers may find that the number of systems necessary to implement the mid-level control systems 106 makes installation and maintenance too difficult. Mid-level control systems 106 are often either too complex, for example mini manufacturing resource planning (MRP) systems for scheduling, or too simple and limited in functionality, for example SCADA/HMI data status only. Also, there is typically a division of responsibility for standard computer information technology (IT) equipment between an IT support group and a plant floor support group.

It is often desirable to have the ability, at ERP level 102, to have direct access to information currently available only on the plant floor, for example, sensor readings or number of units produced. The major roadblock in attaining direct connection between the enterprise level systems and the plant floor devices has been non-standard communication protocols inherent in devices used on the plant floor. The standard communication mechanisms at the enterprise level 102 (e.g. message queues) are different from the standard communication mechanisms at the low level manufacturing device levels 108, 110 (e.g. DeviceNet and other proprietary protocols). Additionally, the number of layers between ERP level 102 and controls and sensors 108 and 110 respectively tends to make direct communication between those levels difficult.

Therefore, it would be desirable to have a means of direct communication between low level control and sensing levels 108 and 110 and the enterprise level 102 both for the acquisition of data direct from the manufacturing floor and the ability to control manufacturing processes directly.

SUMMARY OF THE INVENTION

The present invention provides a means for capturing data and notifying individuals of events that take place on the plant floor, as well as providing the ability to control or modify the manufacturing processes directly. The individuals being notified are typically at the enterprise level 102 of an organization. To allow the acquisition of data, the following capabilities must be present. First, the individuals at enterprise level 102 must have the ability to identify the data in which they are interested. Second, the individuals at enterprise level 102 need to be able to identify the circumstances under which they wish to receive updates of the data. Lastly, the data needs to be transported from the plant floor to a specific place at enterprise level 102, most likely a database or enterprise-level application. These steps are shown in FIG. 2. In box 50, the user must select the data to be sent from the low level to the enterprise level. In box 52, the user defines when or under what conditions the data is to be sent. Finally, in box 54, the user specifies the destination of the data.

The high level view of the system of the present invention is shown in FIG. 3. The heart of the system is enterprise communication controller 500 which is a functional microcomputer which, in the preferred embodiment, plugs into the same backplane 202 as the PLC's 204 which are on the plant floor controlling the manufacturing process and gathering data via sensors. Enterprise communication controller 500 communicates with the PLC's via backplane 202 into which the PLC's are inserted and therefore must speak the native protocol of whichever manufacturer's PLC's are currently being monitored. Enterprise communication controller 500 will run a real time operating system such as, for example, Windows CE, VX Works, QNX or embedded MontaVista Linux, and will have software components installed that facilitate the selection and transport of the data from the PLC's to the enterprise level, as well as having the ability to read and write data to and from PLCs. Enterprise communication controller 500 will also be linked to the higher levels of the organization, such as enterprise level 600 and workbench client 800 via standard Ethernet protocols. Workbench 810 is a software component that executes at a client location typically on a desktop within the intranet or remotely across any network and is used to set up the software component of enterprise communication controller 500. Workbench 810 enables the user to identify and name the data in which the user is interested, the events which trigger the transport of the data from enterprise communication controller 500 to enterprise level 600 and the destination of the data within enterprise level 600, such as databases applications 602. Enterprise level 600 generally consists of the business applications and databases normally used by the company for management of the organization. A specific piece of data may, for instance, flow directly from enterprise communication controller 500 to a particular database 602 at enterprise level 600 or to an application 602 running at the enterprise level 600, via a variety of network protocols.

BRIEF DESCRIPTION OF THE DRAWINGS

The foregoing and other features and advantages of the invention will be apparent from the following, more particular description of the preferred embodiment of the invention, as illustrated in the accompanying drawings, wherein like reference numbers generally indicate identical, functionally similar, and/or structurally similar elements.

DETAILED DESCRIPTION OF THE INVENTION

The model of the present invention is discussed in detail below. While a specific exemplary embodiment is discussed, it should be understood that this is done for illustration purposes only. A person of ordinary skill in the relevant art will recognize that other components and configurations can be used without departing from the spirit and scope of the invention.

Figure 1:
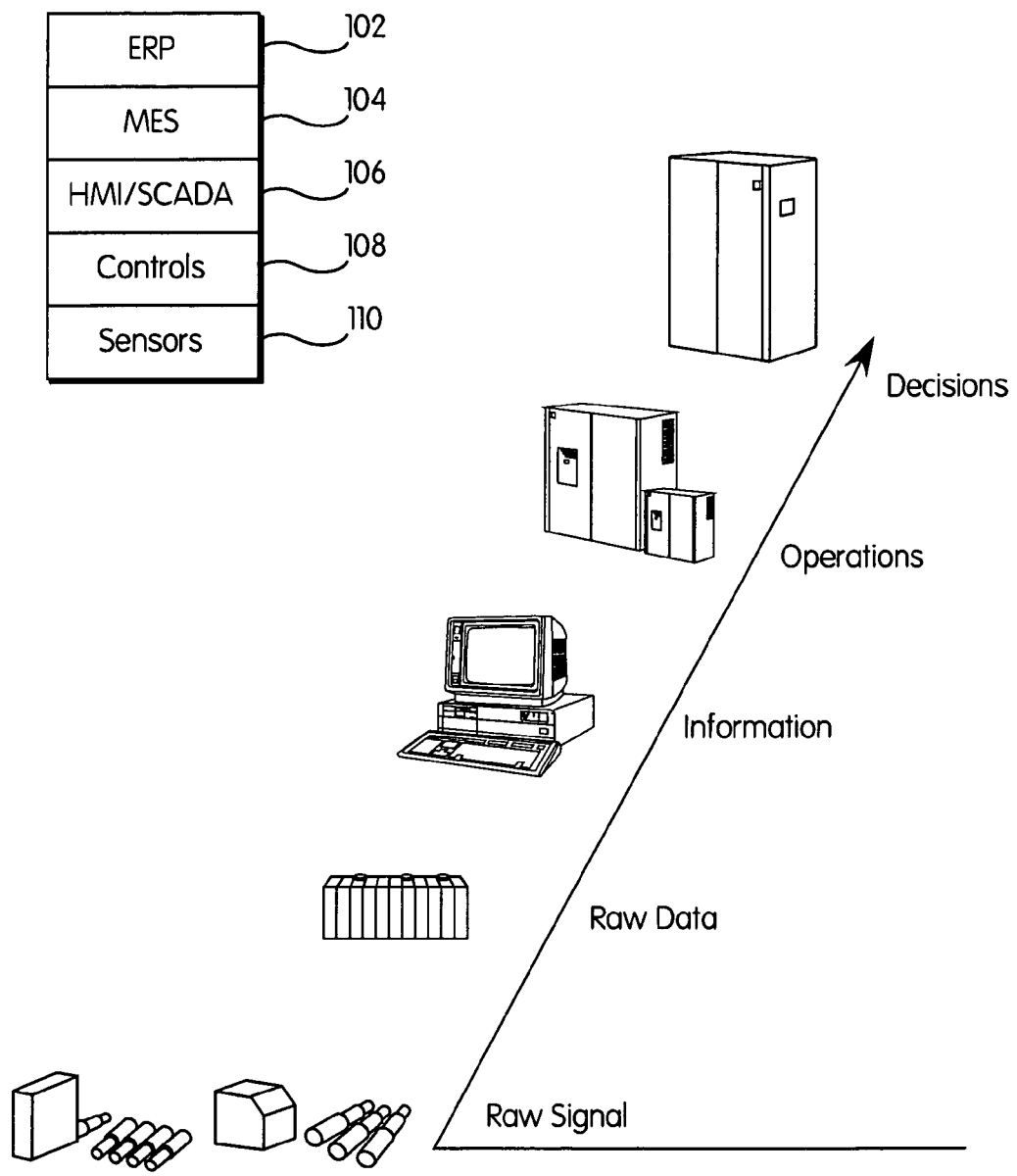
FIG. 1 depicts a prior standard conventional prior art architecture from low level to enterprise level.

An exemplary embodiment of the present invention utilizes a two-tiered architecture to facilitate communications between enterprise level 600 and the plant floor. This configuration may be used in lieu of, or in addition to, typical prior art multi-tiered architectures of the type shown in FIG. 1.

Enterprise communication controller 500 is the heart of the invention, is connected with one or more existing programmable logic controllers (PLC's) and provides connectivity between the PLC device and upstream enterprise systems 602, such as databases and applications. In the exemplary embodiment, the present invention provides the ability to have information such as, for example, inventory levels, product completion numbers and product rework or fault numbers directly available to enterprise level systems 602. The present invention provides a tightly coupled, highly integrated, modular, component-based mechanism to provide direct information to the enterprise from the control domain via a combination of a hardware component and a software module for interface to the upper level enterprise systems 602.

Enterprise communication controller 500 can also accept information from enterprise level 600 to update the condition of any one of the PLCs with which it is connected. This "write-back" feature can be used to make changes to the production activity based on input from enterprise level 600.

Enterprise communication controller 500 can also retrieve data from the enterprise Level and place it on the PLC Controller for use in production. This information can be initiated by a change in state on enterprise communication controller 500 and be used to gather recipes for use in production.

Figure 2:
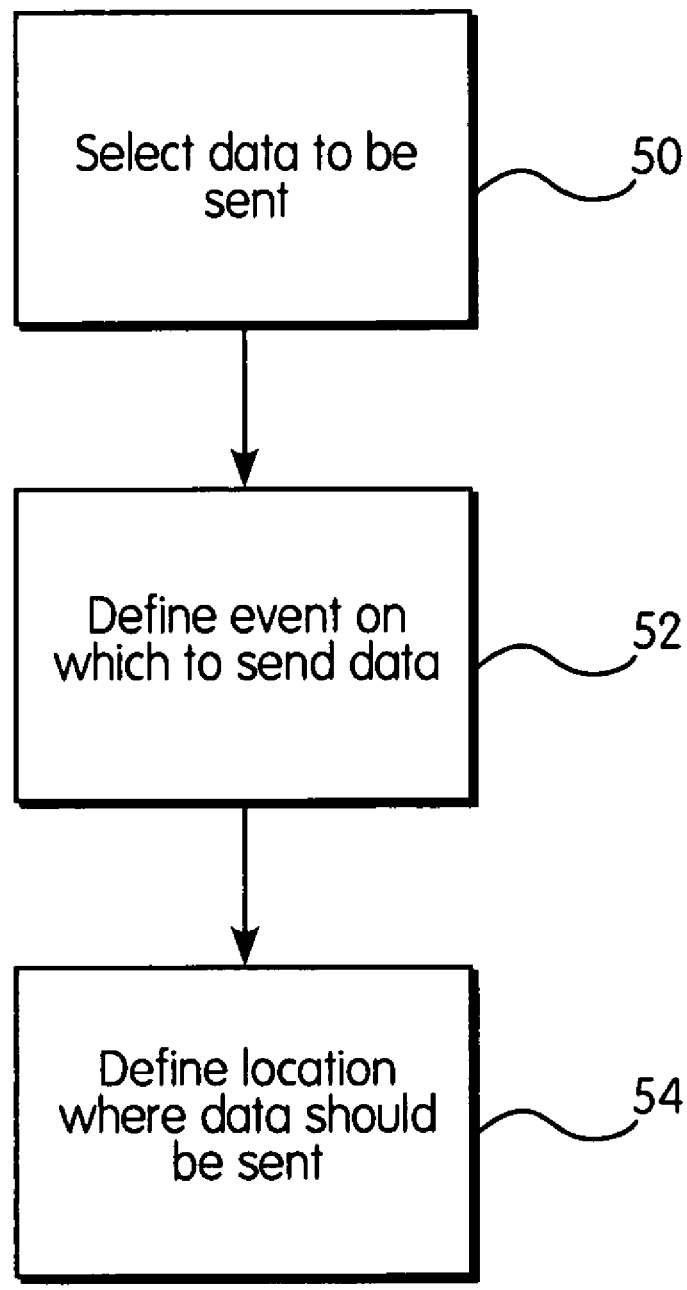
FIG. 2 depicts the functions necessary for the operation of the present invention.

In the exemplary embodiment of the present invention, the user is able to configure the system to move data from the plant floor to enterprise level 600 as can be seen in FIG. 2. The user, at block 50, selects the data to be gathered, defines an event upon which the data is sent at block 52, and defines the location where the data should be sent at block 54. The actions described in blocks 50, 52 and 54 of FIG. 2 are implemented in workbench component 800 shown in FIG. 3 utilizing the concept of projects 620 as shown in FIG. 4.

Figure 3:
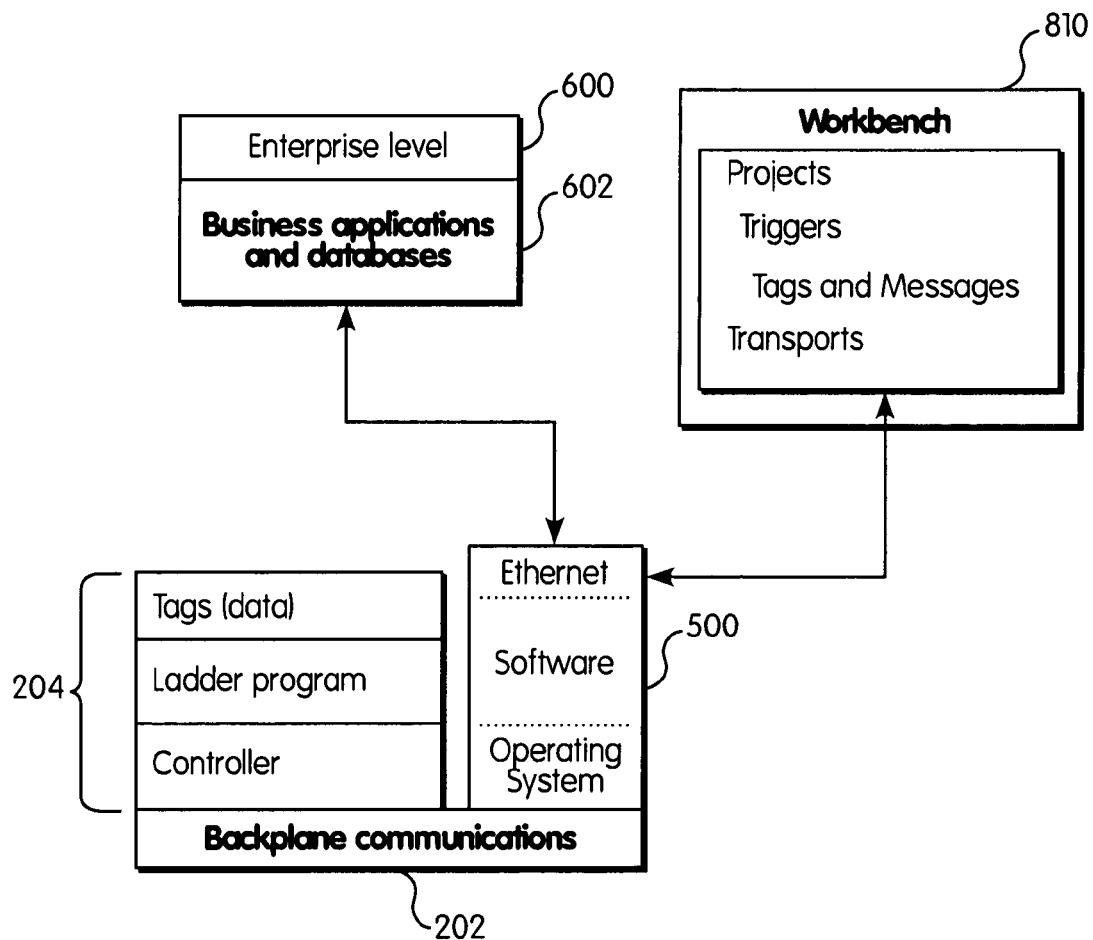
FIG. 3 shows an upper level architecture of the device of the present invention.
Figure 4:
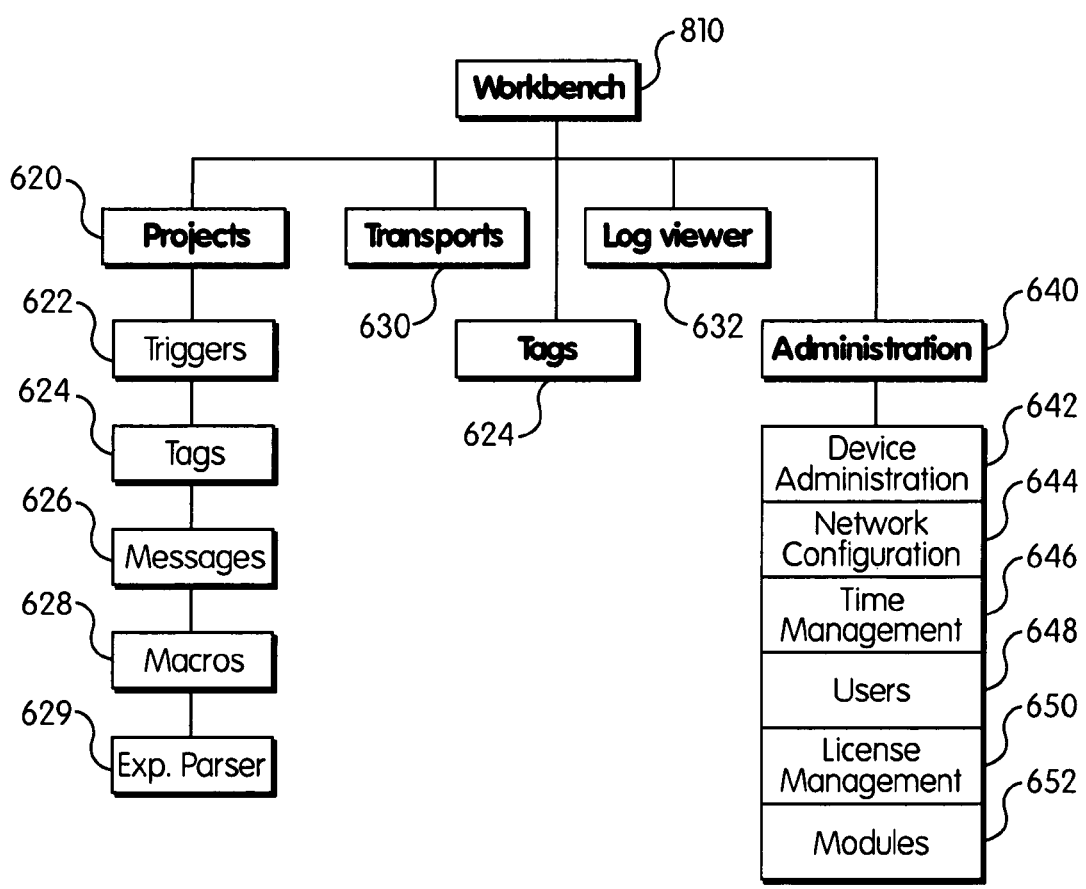
FIG. 4 shows an upper level diagram of the architecture of the workbench component of the invention.

A project 620 is a group of triggers 622 which define events which cause certain pieces of data, named with tags 624, to be sent to enterprise level 600 as shown in FIG. 3. Trigger 622 can be viewed as a predefined response to an event that takes place on the factory floor. When the event occurs, the response is configured to initiate an action such as writing or updating a row of data to a database table, putting a message 626 onto a message queue or sending an e-mail. Events which cause a trigger to execute are either predefined conditions (data triggers) or the receipt of an unsolicited message from a PLC (logic triggers).

Tags 624 are merely ways of identifying certain data points within a PLC in a more friendly way, for example, "production count" instead of "data point 12 on PLC 2".

Data triggers are triggers which are executed as the result of a condition involving certain data points which are being read from a PLC. For example, a data trigger could execute either periodically at a set frequency, at a scheduled time or as the result of a change in certain data points, for example, if a certain data point changes value or is determined to be greater, less than or equal to a certain value.

A logic trigger occurs as a result of the receipt of an unsolicited message from a PLC's ladder logic via backplane 202. For example, a condition occurs which the PLC ladder logic determines needs to be communicated and handled outside of the PLC. For example, a temperature sensor on a production line senses a temperature that exceeds a certain level, indicating a dangerous condition that may required outside action.

In addition to the conditions under which a trigger executes, the trigger also provides several other pieces of information, among these are (1) the content of the notification, known as the trigger payload, that is to be generated when the condition occurs, which may consist of multiple data point values, messages and macro values; (2) the format in which to send the message, such as ASCII, XML, or database insert/update; (3) the method by which the data is to be propagated, for example, DB2, Oracle, Microsoft SQL, IBM Websphere MQ, message queues, JMS, TCP, UDP or e-mail.

Figure 5:
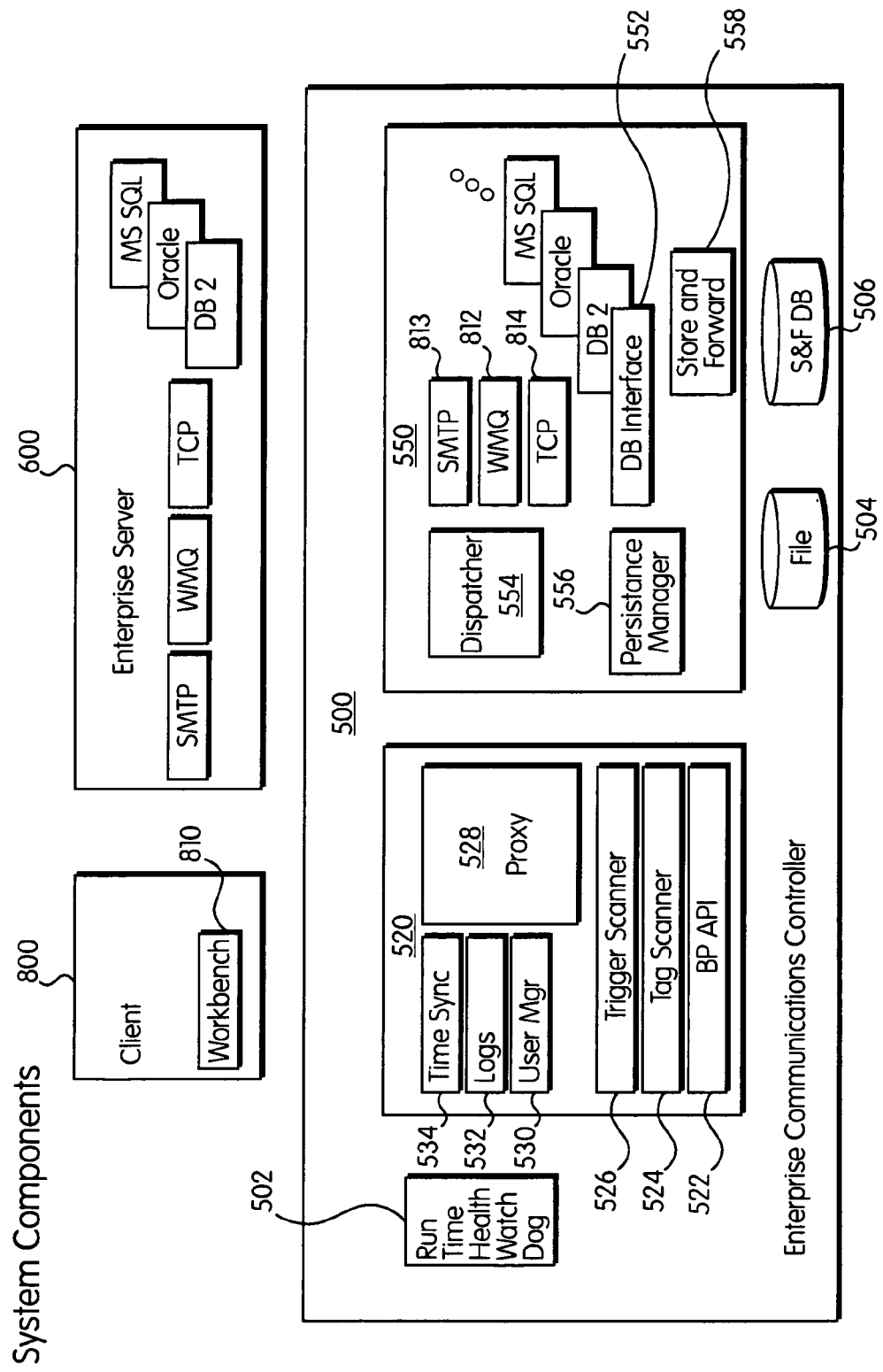
FIG. 5 shows the system components of the enterprise communication controller

FIG. 5 shows the architecture of the system of the present invention and consists of major components enterprise communication controller 500, client 800 with workbench 810 and enterprise computer(s) 600.

Enterprise communication controller 500 is a component which preferably plugs into the same backplane 202 into which PLC's 204 are plugged. Therefore, enterprise communication controller 500 has the ability to communicate with the PLC's 204 via backplane 202. Enterprise communication controller 500 consists of a standard, multi-purpose computer having an operating system and various software components of the present invention installed thereon. Preferably, enterprise communication controller 500 will run either a version of a real time operations system such as VX Works, QNX, MontaVista Linux or the Windows CE operating system. Enterprise communication controller 500 will also be equipped with a specialized connector capable of plugging into backplane 202. This connector will, of necessity, be configured according to the type of PLC 204 to which enterprise communication controller 500 is being interfaced. Naturally, different manufacturer's PLCs will have differently configured backplanes 202. In addition, there is a driver 522 as shown in FIG. 5 which provides an application programming interface to the software components of the present invention to allow direct communication with PLC 204 via backplane 202, and, in particular, provides enterprise communication controller 500 with the ability to read specific data points from PLCs 204 and write new values into specific data points within PLC's 204. As with the physical connector, backplane API 522 will be customized, depending upon the manufacturer of the PLCs.

Client 800 is a computer running at some level within the organization or remotely across any network, such as the Internet. This computer runs software workbench 810, which is a user interface that allows users of the system to define projects 620, name data points with tags 624 and add triggers 622 to projects 620 and the conditions under which triggers 622 will be executed. This information is communicated to enterprise communication controller 500 in a process which will be described later.

Enterprise communication controller 500 is equipped with special software components including scanner portion 520 and transaction server component 550, having various functional components therein. Note that, although the functional components of the present invention have been divided up as described, a person of skill in the software arts will realize that any implementation of the functions described could result in an architecture that looks different, but which provides the same functionality as the particular embodiment described, and that such variations are intended to be with the scope of the invention.

Scanner component 520 is generally responsible for communicating with workbench 810, for tracking tags 624 and triggers 622, for determining when trigger events have occurred and for communicating with PLCs 204.

Tag scanner 524 is the component that knows the names, or tags, of the various data points on the PLC's 204 and which is capable of retrieving the particular data from the PLC's 204 or writing particular data to the PLC's 204 via backplane API 522.

Trigger scanner 526 is a component that determines when it is time to execute various triggers. For example, trigger scanner 526 may query tag scanner 524 to determine if a particular tag 624 has satisfied some logic condition, such as exceeding a pre-determined value and, if so, determines the appropriate action to be taken in response to trigger 622, for example, sending a message to a database 602 within enterprise server 600. Trigger scanner 526 is also responsible for either periodically checking or subscribing to changes in the values of certain tags 624 and taking the appropriate actions.

Component proxy 528 within scanner 520 is the component which interfaces with workbench 810, receiving messages therefrom and deciding where to route those messages. For example, some messages coming from workbench 810 will need to be passed via proxy 528 directly to trigger scanner 526, such as commands for the creation, enabling, stopping, and deleting a of a trigger 622. In addition, some commands which pass from the workbench 810 through proxy server 528 will need to be sent to dispatcher 554 within transaction component 550. Such commands will be discussed later.

Time sync manager 534 within scanner 520 is responsible for maintaining synchronization between all clocks within the system, including the option to maintain clocks which are internal to PLC's 204. The time sync manager will synchronize the times within the PLC's 204 and within enterprise communication controller 500 either via reference to an external master clock or via a clock internal to enterprise communication controller 500. The preferred time reference can be specified in the configuration section of workbench 810. The goal of the time sync manager 534 is to synchronize all portions of the software within enterprise communication controller 500 with any messages coming from the plant floor via the PLC's 204 which may have time stamps contained therein.

Log manager 532 is a component that logs all activity that happens within controller 500 and keeps this information. in logs. In the preferred embodiment, log manager 532 stores information in two separate logs, the first being for user activity and the second being for exception activity Log Manager 532 can also be configured to report via e-mail at periodic intervals or critical events. For example, if an exception occurs, (e.g., enterprise communication controller 500 attempts to communicate with enterprise server 600 and is unable to do so) there will be an entry in an exception log which is generated by log manager 532. In addition, the creation of projects via workbench 810 and their related triggers, and the starting and stopping of projects is also maintained in an event log via log manager 532. Log manager 532 is capable of creating and maintaining a complete audit trail.

User manager 530 is responsible for the creation of users and their authentication. Various users logged into workbench 810 are allowed to do various tasks depending upon their privilege level. For example, a particular user may not be allowed to create triggers 622 but may be able to run already defined projects 620 and view the results thereof. The user manager is able to authenticate various levels of privilege. There are two models for user management. In one, the user privilege tables are maintained on enterprise communication controller 500. In the alternate model, user manager 530 may be integrated to an enterprise level user management system, such as a central user privilege list or central authentication system, such as LDAP or Kerberos, which would allow a single location for user management within the enterprise. Levels of privilege would stored in the centralized enterprise level system and used by the local user manager 530.

Figure 13:
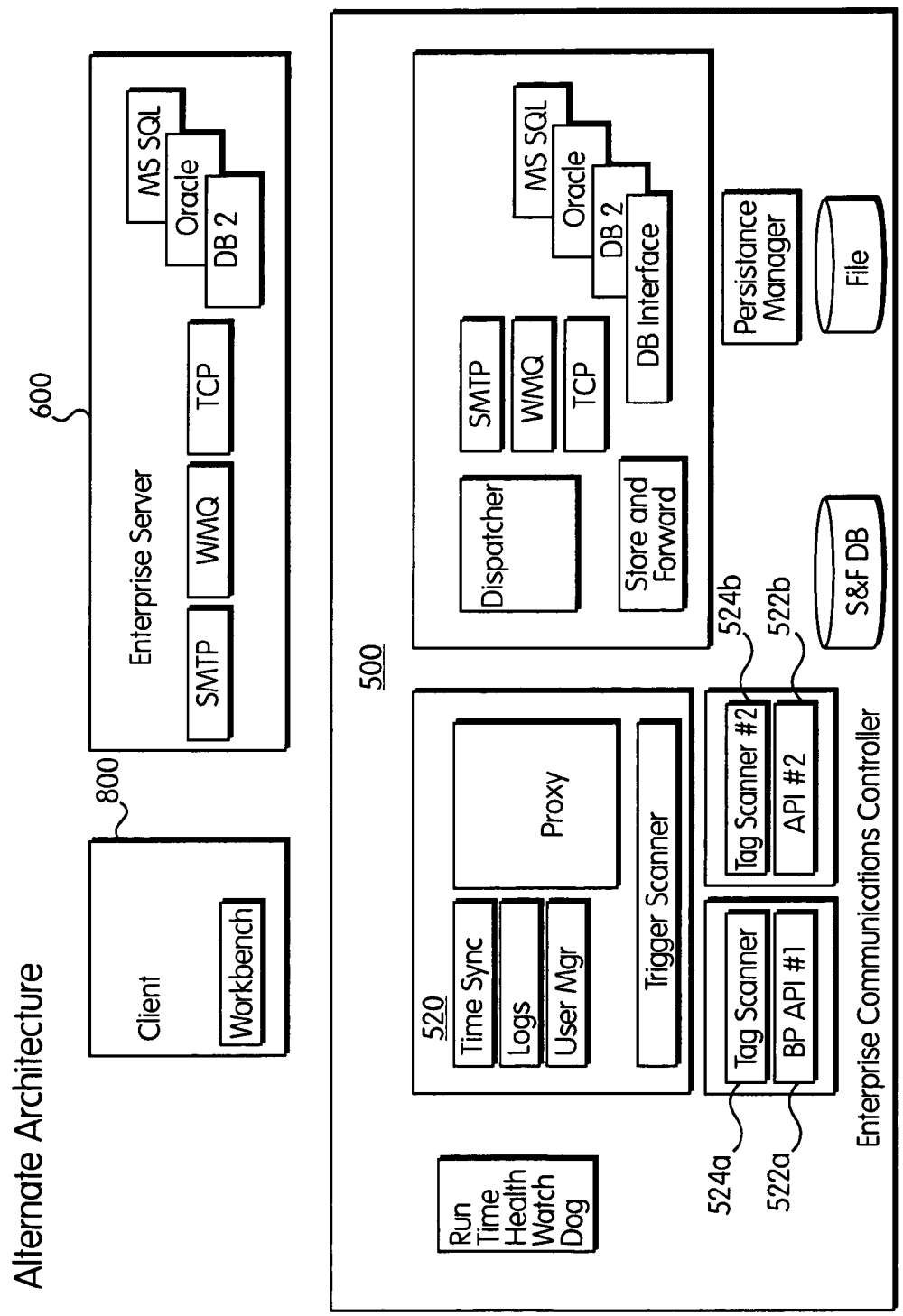
FIG. 13 shows an alternate embodiment for direct connection to additional external devices.

In the current embodiment of the invention, all components within scanner 520 in FIG. 5 run in a single process on enterprise communication controller 500. Likewise, transaction component 550 is a separate process and all components within transaction component 550 may run in a single process separate from scanner process 520. Scanner 520 and transaction component 550 are able to communicate with each other via standard mechanisms provided by the operating system for inter-process communications. However, alternative architectures where portions may run in separate processes are acceptable as shown in FIG. 13.

Transaction component 550 is generally responsible for maintaining various information on non-volatile storage local to enterprise communication controller 500 and for sending and receiving message to and from enterprise server 600.

Dispatcher 554 within transaction component 550 receives messages from processes at the enterprise level 600, from the workbench 810 or from scanner proxy 528 and determines where within transaction component 550 those messages need to be sent. In that sense, it is very much like scanner proxy 528 within scanner 520. For example, if trigger scanner 526 within scanner 520 determines that a message needs to be written to a database, a message will be sent to dispatcher 554 via scanner proxy 528 and dispatcher 554 will route the request to database interface 552, which will eventually update a database on enterprise server 600, and respond via dispatcher the success or failure of that operation. Dispatcher 554 will dispatch messages to various other components within transaction component 550 depending upon (1) where the message is to be sent and (2) how the message is to be sent. For example, if a message generated within scanner 520 is to be sent to an MS SQL database on enterprise server 600, dispatcher 554 is able to determine where to send the message to accomplish this task.

Persistence manager 556 within transaction component 550 is responsible for maintaining all information needed to run the system, including all defined projects, all triggers, all transports, and anything else that needs to be stored should the system need to be restarted. This information is stored in a file 504 on an internal disk or other non-volatile storage within controller 500, and is utilized mainly in the case where controller 500 loses power and needs to be restored. The last known current state of all software components on controller 500 is read from file 504, thereby allowing controller 500 to continue when power has been restored.

Database interface 552 is part of the transaction transport mechanism for transporting data from enterprise communication controller 500 to enterprise level 600. Database interface 552 is responsible for storing information read from PLC's 204 into databases on enterprise level 600 via any one of a number of database communications protocols. The databases may be any form of databases such as DB2, Oracle, or MS/SQL databases. Database interface 552 may be a single component or may be multiple components, each responsible for a particular type of database.

Message queuing interface 812, SMTP interface 813 and TCP interface 814 are the part of transaction component 550 which is responsible for transporting data and messages from enterprise communication controller 500 to enterprise level 600. These interfaces can be used to move data to applications at enterprise level 600 that may accept data through various ways such as by receiving information from a message queue, parsing the contents of an e-mail sent to a particular address through SMTP, or reading data from a TCP/IP socket. Message queuing could be implemented via a variety of tools such as Websphere Message Queues, Java Message Queues, JBOSS JMS message queues, or Weblogic JMS message queues.

Store and forward component 558 is a component that will store messages intended for applications or databases 602 at enterprise level 600 in the case that communications are unavailable between enterprise communication controller 500 and enterprise level 600. The messages are stored in store and forward database 506 located on a local hard disk or other non-volatile storage within enterprise communication controller 500. The store and forward component 558 will forward any messages stored within store and forward database 506 to enterprise level 600 when communications have been reestablished. These messages will be sent in sequence in which they were initially received.

Figure 6:
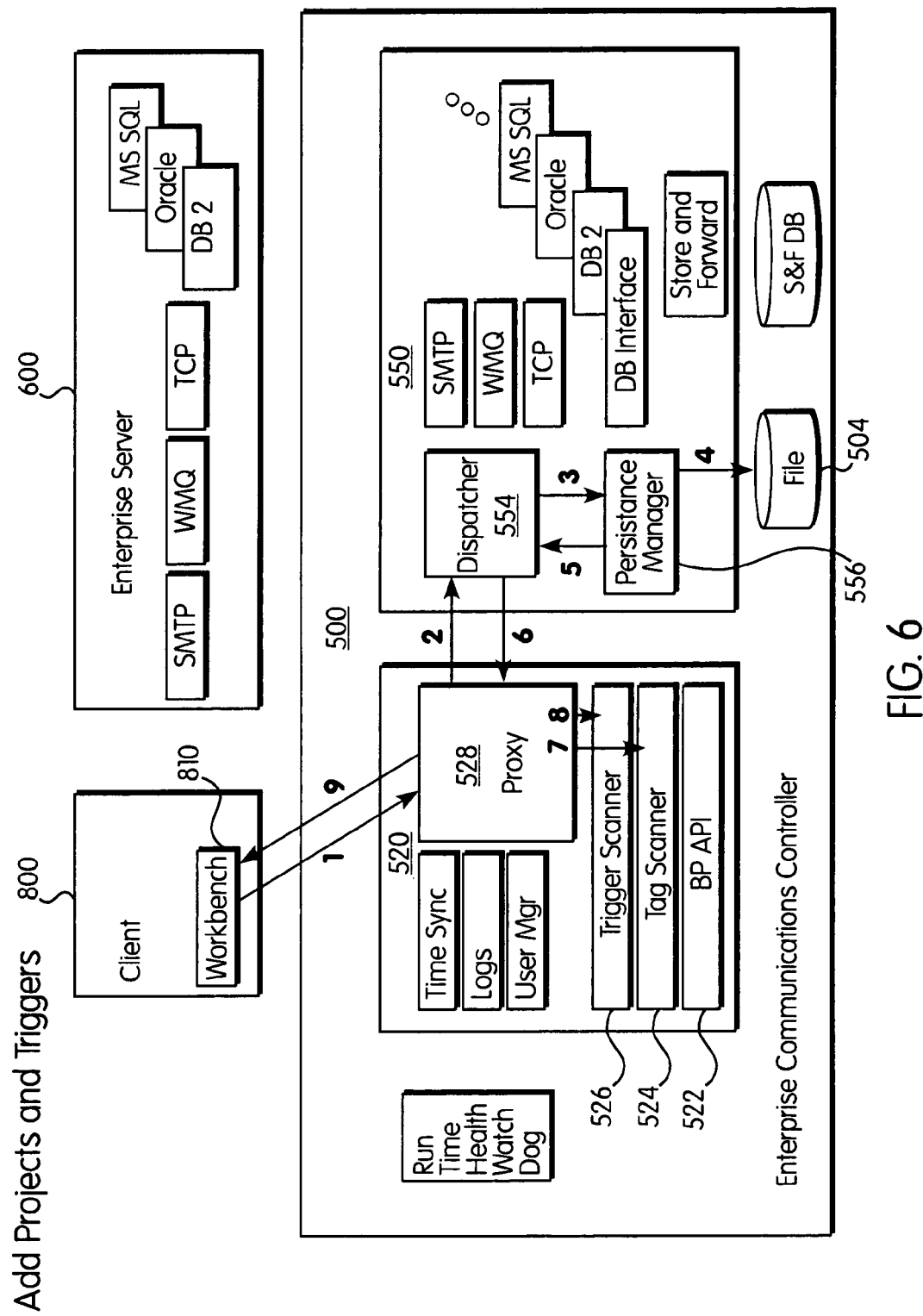
FIG. 6 shows the process by which projects and triggers are added.

FIG. 6 shows the process by which projects and triggers are added to enterprise communication controller 500 utilizing workbench 810. The user sends a message 1 to proxy 528 which states that the user wishes to create a project. The messages sent from workbench 810 via arrow 1 could be the creation of a project, the addition of a trigger to a project, the naming of a data point with a tag, etc. Scanner proxy 528 routes this message to dispatcher 554 via arrow 2. Dispatcher 554 determines that this is an event which needs to be stored within file 502 via the persistence manager 556, therefore, message 3 is sent to persistence manager 556 which in turn stores the information in file 504 via arrow 4 and returns the success or failure of that action to dispatcher 554 via arrow 5. Dispatcher 554, once it has received status via arrow 5 from persistence manager 556, forwards that information to scanner proxy 528 via arrow 6. At this point, the information is stored permanently in file 504. Scanner proxy 528 then sends messages to tag scanner 524 and trigger scanner 528 via arrow 7 and 8 respectively to tell them to add a trigger or a tag to the project.

Figure 7:
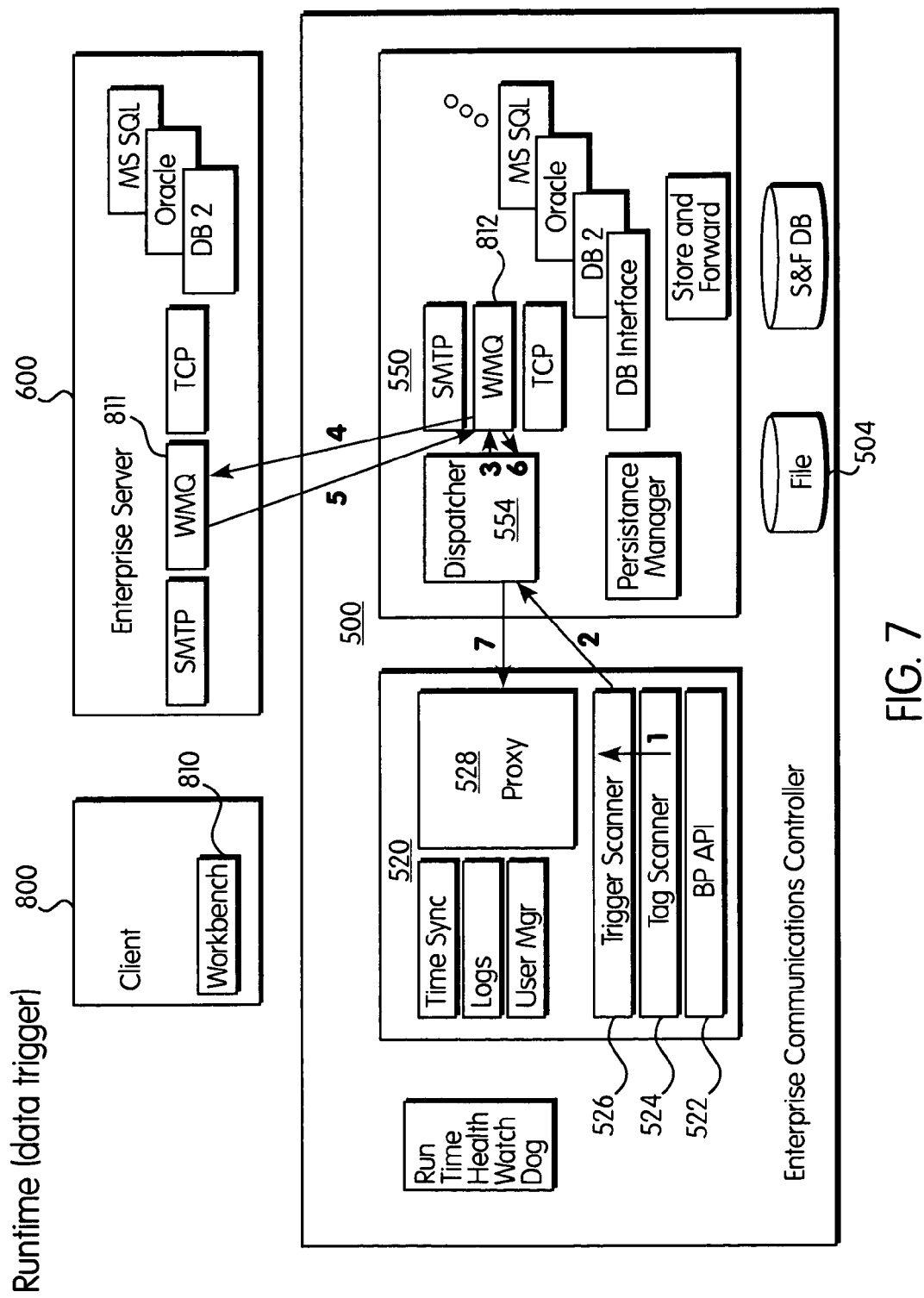
FIG. 7 shows the functions of the enterprise communication controller based on a run-time data trigger.
Figure 8:
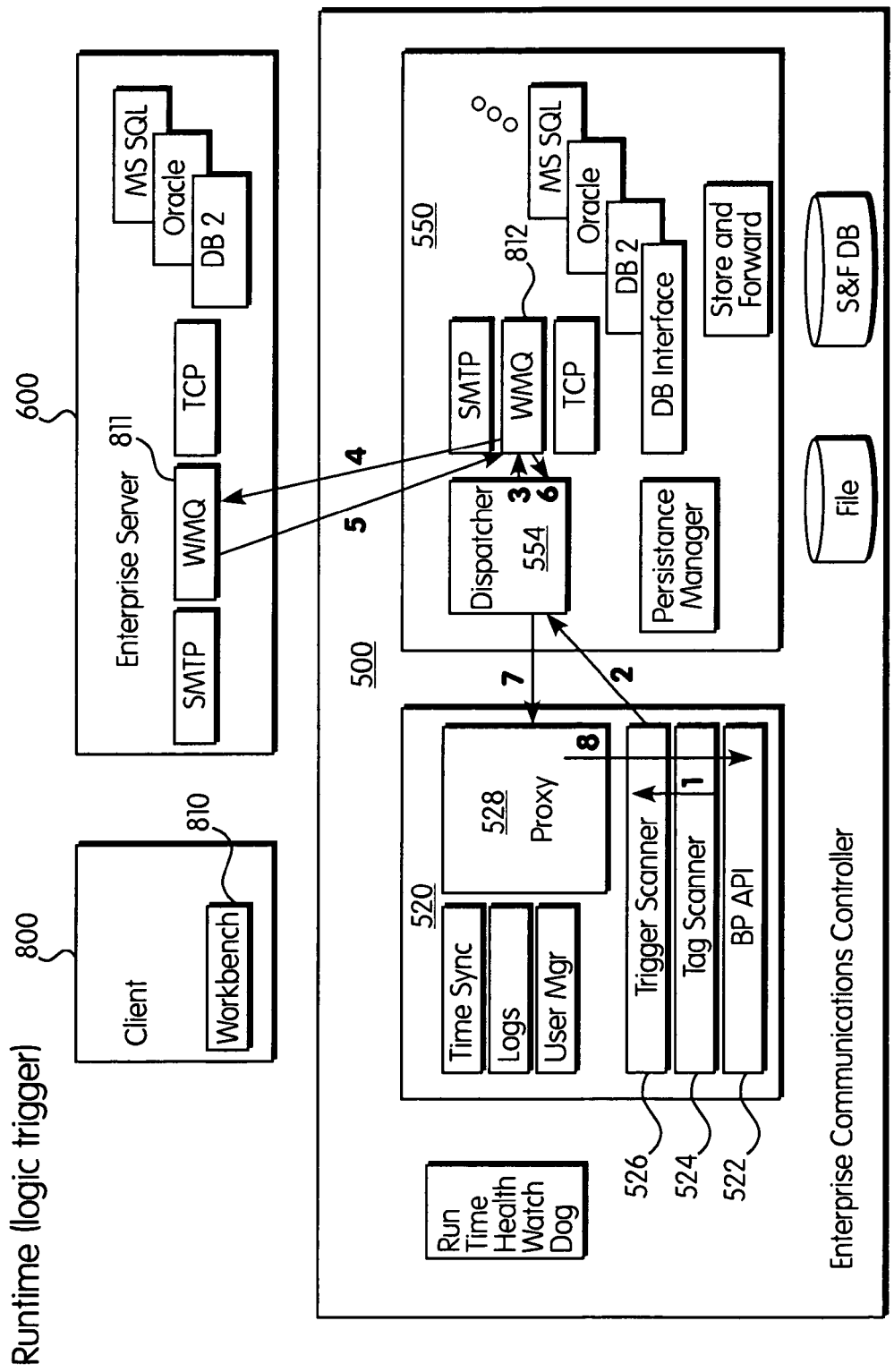
FIG. 8 shows the functions of the enterprise communication controller based on a run-time logic trigger.

Data triggers and logic triggers are shown in FIGS. 7 and 8 respectively. To explain the data trigger in FIG. 7, we will assume that a project 620 has already been created and a trigger 622 defined. For purposes of explaining the data trigger, assume that we wish to trigger a message to the enterprise server when a particular data point on a PLC has changed. For example, a user at the enterprise level 600 wishes to be notified when a data point representing a production count is incremented on one of PLCs 204. In this case, tag scanner 524 will poll the particular data point which represents the production count in PLC 204 at a predetermined rate, for example, once every second. Therefore, a message is sent from tag scanner 524 to the backplane API 522 every second to retrieve the data and the data is propagated to trigger scanner 526 via arrow 1. Trigger scanner 526 evaluates the data to see if the value has changed between the current reading of the data and the previous reading of the data and if so, trigger scanner 526 takes the data, packages it in a message and sends it to dispatcher 554 via arrow 2. The message sent from trigger scanner 526 to dispatcher 554 contains information regarding the transport, that is, where the data is to be sent within enterprise level 600 and how the data is to be sent. Dispatcher 554 determines where the message needs to be routed to be handled properly. For instance, if the message is to be sent via message queues, dispatcher 554 will send a message via arrow 3 to message queue handler 812, which will send the message via arrow 4 to message queue manager 811 within enterprise level 600. Message queue handler 811 within enterprise level 600 then sends a message back via arrow 5 to message queue manager 812 within transaction component 550 saying that the message has been received. This information is sent via arrow 6 to dispatcher 554 and the status message is sent to scanner proxy 528 via arrow 7. Note that, should the acknowledgement sent via arrow 5 not be received, dispatcher 554 would eventually cause the message to be stored in store and forward database 506 via store and forward component 558 for later transmission to enterprise server 600. Additionally, arrow 7, which goes to scanner proxy 528 may cause a log message to be written via log manager 532.

With reference now to FIG. 8, FIG. 8 shows the flow of information which occurs as a result of a logic trigger, which is a trigger generated within the ladder logic of a PLC. The flow of the messages in FIG. 8 is very similar to that of FIG. 7, with the exception of arrows 1 and 8. In FIG. 8, arrow 1 indicates a message coming directly from a PLC via backplane API 522. This information is passed to tag scanner 524 and trigger scanner 526 to determine what should happen as a result of the reception of the message from PLC 204. The message, for example, could be an error condition detected by the PLC 204 or it could be, for example, a message which is sent as a result of a change in a particular data point on PLC 204. In any case, the ladder logic of PLC 204 will determine when such messages are to be sent. In other words, PLC 204 decides that some entity at the enterprise level 600 needs to know about the data which it is sending. From this point on, the execution and propagation of the message through scanner 520 and transaction component 550 to enterprise server 600 is identical to that described for the data trigger in FIG. 7, except that when the status message is received by scanner proxy 528 via arrow 7, the message is sent to PLC 204 via arrow 8 and backplane API 522 to let PLC 204 know that the data was successfully transmitted to the enterprise level. In the event that PLC 204 fails to get the confirmation of a successful transmission after a certain period of time, PLC 204 will presumably have some logic that will be executed to deal with the failure. In such a case, PLC 204 would likely retry sending the data or setting an alarm saying that the data transfer has failed.

Figure 9:
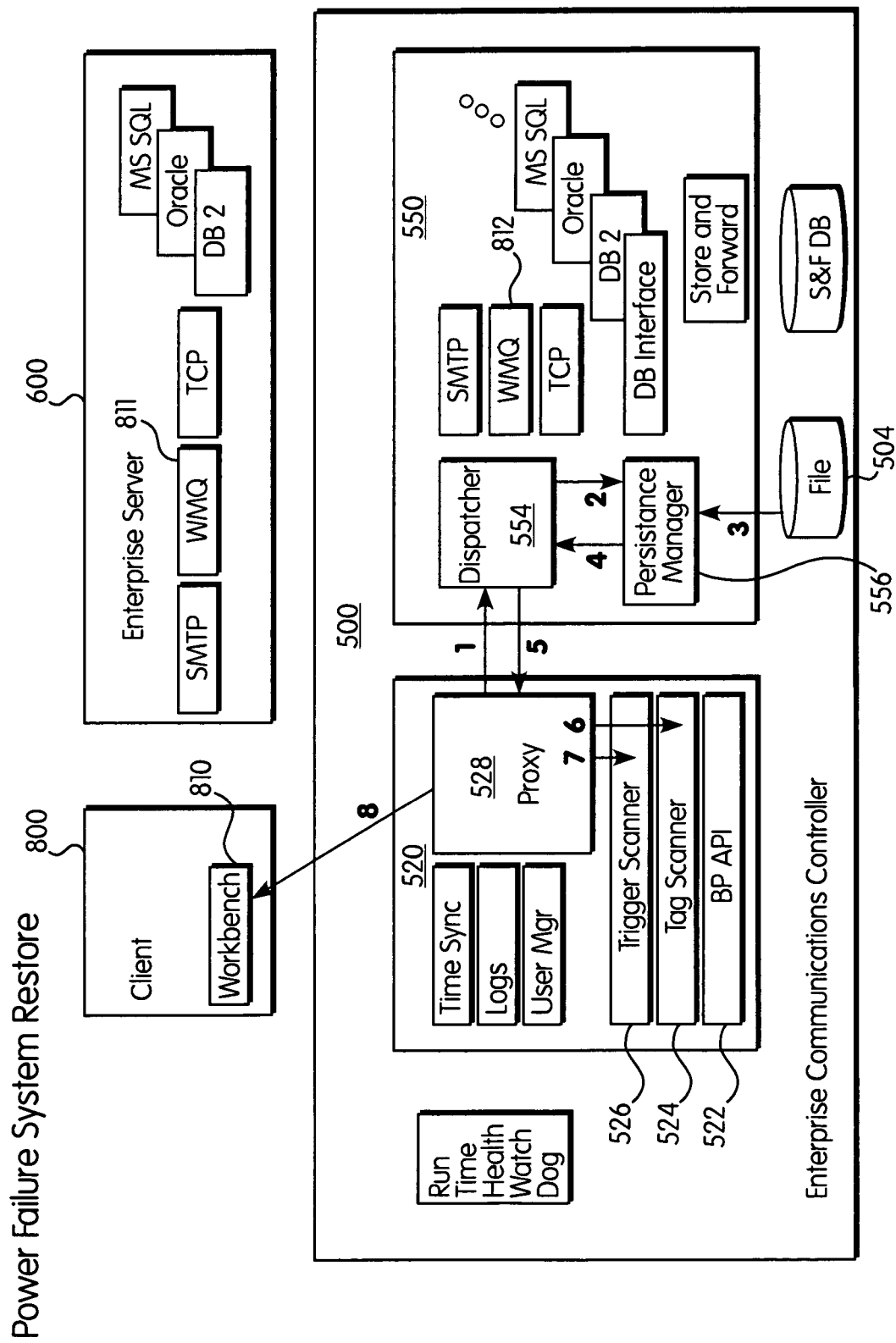
FIG. 9 shows the functions of the enterprise communication controller after a power failure.

FIG. 9 depicts the process by which controller 500 restores itself after a power failure. In this case, the goal is to restore enterprise communication controller 500 to the state it was in prior to the power failure. The state information is accessed via persistence manager 556 from file 504. Proxy 528 sends a message via arrow 1 to dispatcher 554. Dispatcher 554 determines that persistence manager 556 is necessary to complete the request and sends a message via arrow 2 to persistence manager 556. Persistence manager 556 retrieves the previous state of enterprise communication controller 500 from file 504 via arrow 3 and sends it via arrow 4 back to dispatcher 554, who relays it to scanner proxy 528. Scanner proxy 528 is then able to reestablish all triggers 622 via a message arrow 7 to trigger scanner 526 and is able to reestablish all tags 624 via arrow 6 to tag scanner 524.

Figure 10:
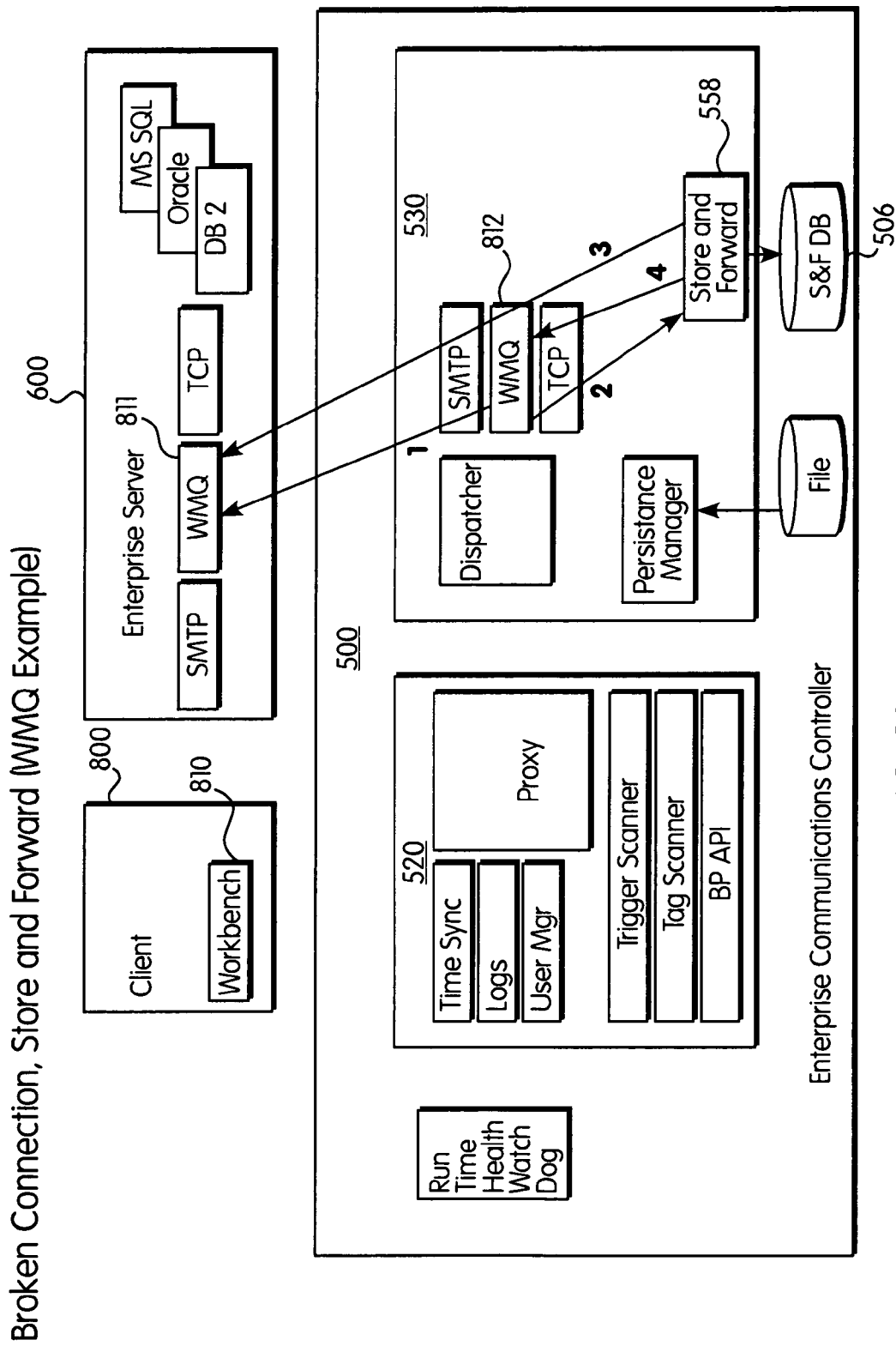
FIG. 10 shows the functions of the enterprise communication controller when the condition of a broken connection between the low level and the enterprise level is encountered and the store and forward function is activated.

FIG. 10 depicts the operation of the store and forward feature previously discussed. The store and forward feature is invoked when messages need to be sent to enterprise server 600, but are unable to be sent because of a failed network connection. The store and forward component will periodically attempt to reestablish communications with enterprise server 600. When communications are reestablished between enterprise communication controller 500 and enterprise server 600, all messages stored in the store and forward database 506 are forwarded to enterprise server 600, in the order they were received. In the case shown in FIG. 10, wherein message queue handler 812 is the transport of choice for these particular messages, as soon as message queue handler 812 determines that it has an error with the communication channel arrow 1 with the message queue manager 811 on enterprise server 600, message queue handler 812 sends a message via arrow 2 to store and forward manager 558. Store and forward manager 558 retrieves all messages that need to be sent via message queues via arrow 2. Store and forward manager 528 periodically attempts to reconnect to the message queue manager 811 on enterprise server 600 via arrow 3. When connections are re-established, store and forward manager 528 sends the stored messages via arrow 3 to message queue manager 811 on enterprise server 600. An acknowledgement is then sent back to message queue handler 812 from store and forward manager 558 via arrow 4, and normal operations via arrow 1 are resumed. The copy of the data is then removed from store and forward database 506. This same store and forward mechanism can be applied to any of the supported transport mechanisms.

Figure 11:
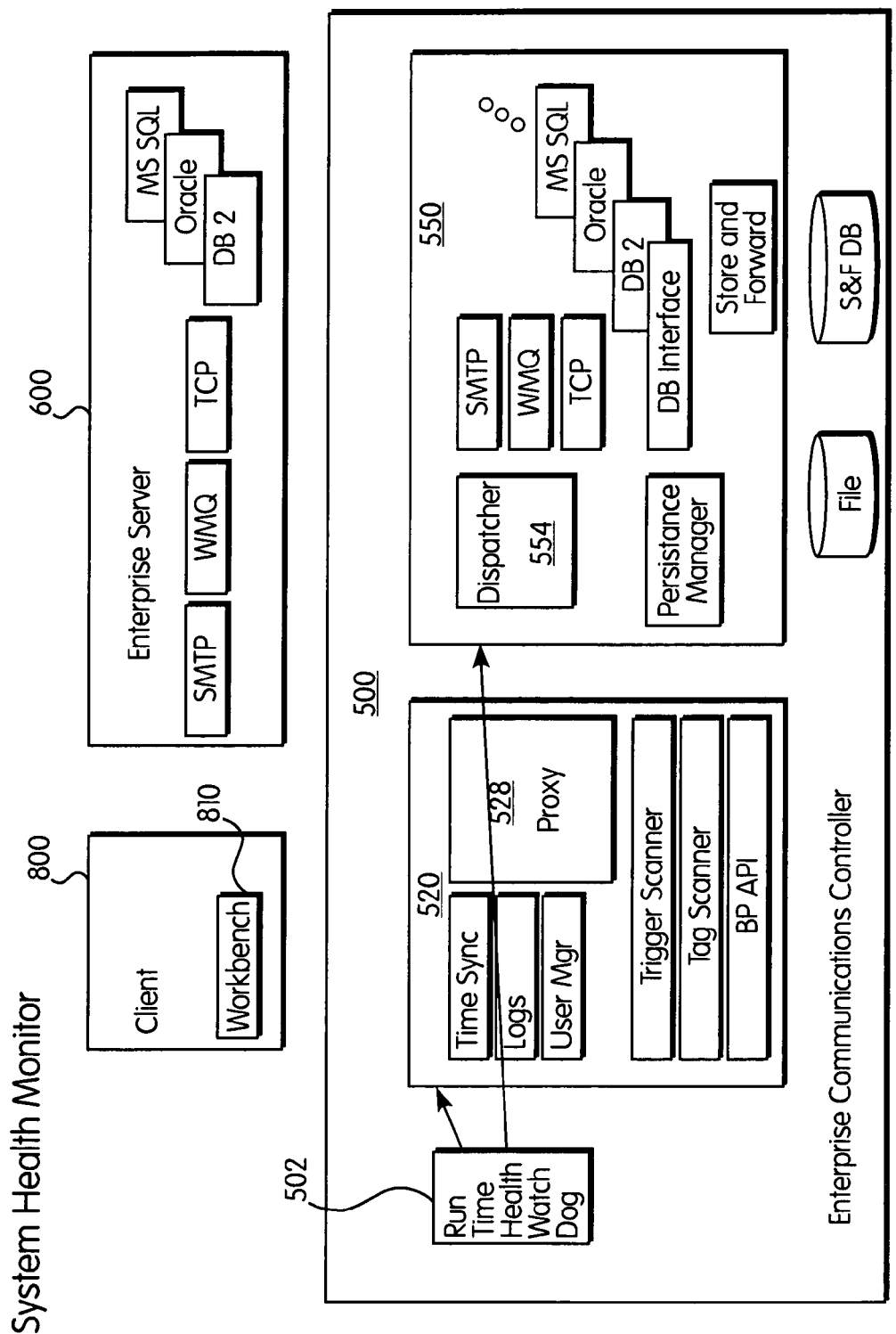
FIG. 11 shows the operation of the watchdog facility or systems health monitor.

FIG. 11 depicts the operation of the watchdog system health monitor. The watchdog facility 502 determines if the processes in which scanner 520 and transaction component 550 are being executed are alive and well. Watchdog component 502 is periodically communicating with the operating system to retrieve information about theses processes via their process identifiers. Should the watchdog monitor determine that the process identifier for either process is invalid, indicating that the process is no longer executing, the surviving process is shut down and both processes are restarted in their proper sequence and preferably, at that point, the previous state of enterprise communication controller 500 is restored from file 504.

Figure 12:
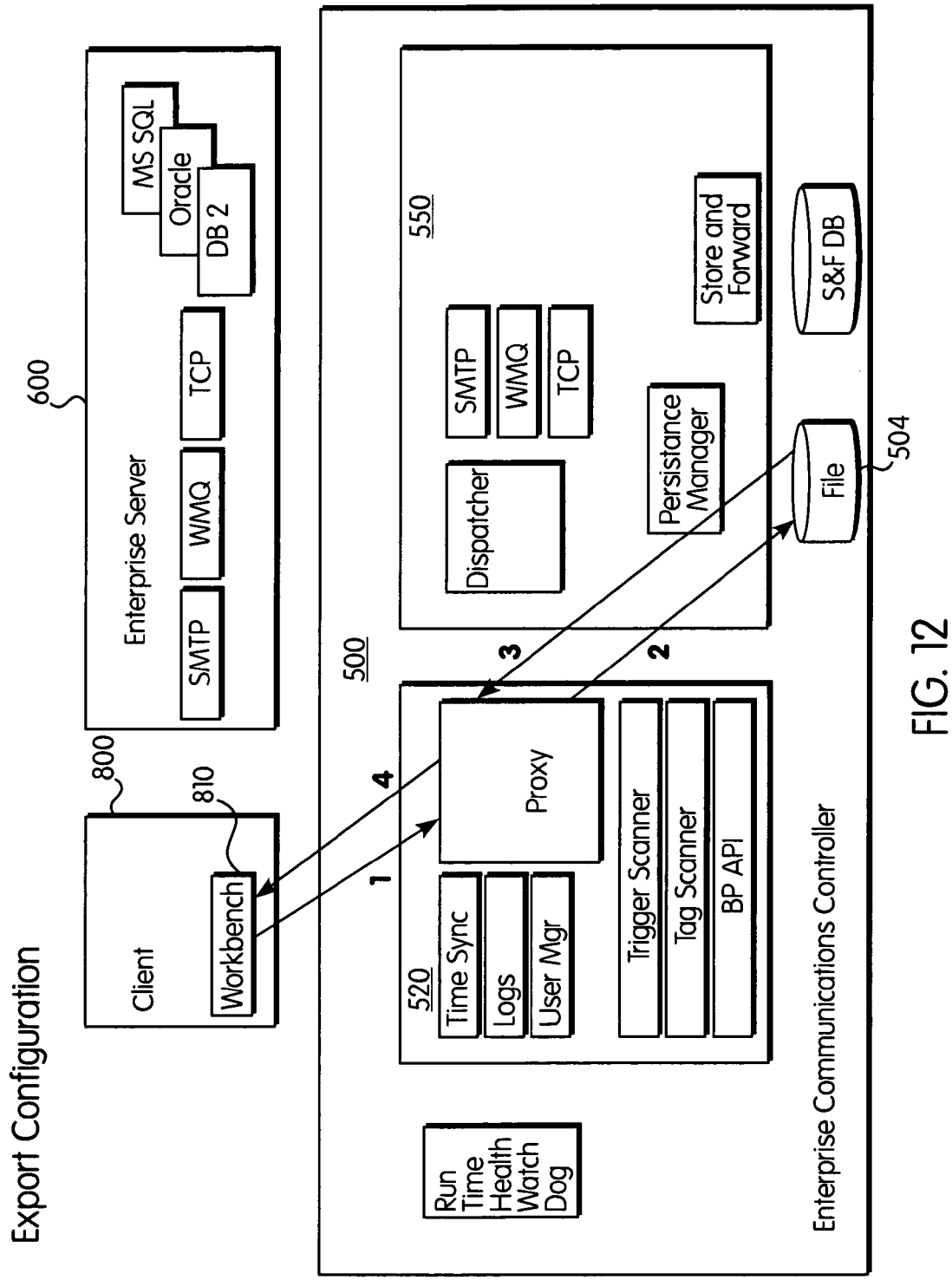
FIG. 12 shows the operation of exporting the configuration.

FIG. 12 shows a facility wherein the configuration of enterprise communication controller 500 is exported to workbench 810. This may be useful, for example, when the set up needs to be replicated on a different enterprise communication controller 500. Workbench 810 sends a message via arrow 1 to scanner proxy 528 in scanner 520. Scanner proxy 528 sends a message to persistence manager 556 via arrow 2. Persistence manager 556 retrieves the current state from file 504 and returns it via arrow 3 to scanner proxy 528, which returns it via arrow 4 to workbench 810 on client 800.

Workbench component 810, shown in FIG. 4, is the user's workstation and interface to enterprise communication controller 500. Typically, workbench 810 will run on a user level computer at the enterprise level 600 of the organization. However, because workbench 810 communicates with enterprise communication controller 500 via standard internet protocols, workbench 810 could be located virtually on any computer within the organization or external thereto. As discussed previously, one function of workbench 810 is to allow users to create projects 620. The workbench 810 allows the building of projects and the saving of the projects to enterprise communication controller 500, where they will be added to file 504 by persistence manager 556. Workbench 810 also provides a facility to start, stop, export, and import projects 620. Workbench 810 can interact with multiple enterprise communication controllers 500 during the same session to perform operations such as listed above in each enterprise communication controller 500.

Projects consist of a group of triggers 622 defining the circumstances under which data is transported from enterprise communication controller 500 to enterprise server 600. Triggers can contain tags 624, messages 626, macros 628 and expressions 629. Tags 624 define data type triggers, while messages 626 define logic type triggers. The macro facility 628 defined within triggers allows the trigger to perform simple pre-defined manipulations of data. The expression parser 629 allows the user to manipulate data which may be from either the PLC or from enterprise server 600. For example, the user may create an expression to change the value of a number, such as changing a temperature from Celsius to Fahrenheit degrees prior to its transport to the enterprise server 600. Also included within triggers 622 is knowledge of the transport 630 which will be used to transport the data from enterprise communication controller 500 to enterprise server 600.

Workbench 810 can be used to define transports 630. Transports 630 are the mechanism wherein the user is able to provide destination and format information for the data as it is sent from enterprise communication controller 500 to enterprise server 600. Transports can be any one of a number of types including TCP, message queues, database (for relational databases) and SMTP (e-mail). The type of transport created is dependent upon the applications and/or databases to which the user wishes to send the data. To communicate with an application running at enterprise server 600, the application must be able to understand one of the protocols and be able to accept messages via that protocol. Data can typically be sent to a specific location (i.e., an application) on the enterprise intranet, to a location on the internet, or can be stored within enterprise server 600 in a database such as a DB2, Microsoft SQL, or Oracle database. The format of the data could be any one of a number of formats including XML, ASCII, or a database insert/update.

Workbench 810 is also allows the user to view tags 624 returned by enterprise communication controller 500. Tag 624 are named data points within the PLC's ladder logic program which represent memory locations within the PLC. Workbench 810 is able to provide a tree view of the tags from which the current values of the data points in the PLC's will be able to be read.

Log viewer 632 within workbench 810 provides a means for viewing system events and exception error logs. Log viewer 632 is a tool to allow users to view the logs which have been created by log manager 532 on enterprise communication controller 500. Typically, these logs would include an audit log and an exceptions log which can be used as a diagnostic tool to trace and interpret user activity, errors and system messages. Typically, activity taking place on PLC 204 is logged by date, time, activity, type and/or user.

Workbench 810 is also the center for the administration of all of enterprise communication controllers 500 to which it is able to connect. The administration module 640 provides means for performing administrative functions such as device administration 642, configuring the network setting 644 of enterprise communication controllers 500, including the settings of IP address, defining users and their privilege levels 648, providing a license management function for the workbench software which may be needed for various transport protocols 650, and viewing the status, via module status 652, of all PLC's which were installed in the same chassis with enterprise communication controller 500. The administration function 640 may also provide a means for providing an external time synchronization signal to enterprise communication controller 500 and to all PLCs to which it is connected. The time management function 646 of the workbench allows the users to set the current time, set the synchronization settings, and set the synchronization servers that will serve as the external time reference for the overall system. The synchronization settings include the frequency of updates and whether or not controllers 500 will act as clients to the external time reference or will act as both clients and servers to other enterprise communication controllers 500. It is also possible to set the synchronization method or protocol such as, for example, simple network time protocol (SNTP), user data protocol (UDP), TCP protocol, or some other commonly known protocol used to synchronize time. The administration function also provides a means to define exception notification lists based on groups of email addresses.

When workbench 810 is started, it has the capability of searching the network for available enterprise communication controllers 500 which may be connected to the internet or intranet. The scope of the search of workbench 810 for available enterprise communication controllers 500 may be limited by specifying a IP subnet address.

There are several alternate embodiments of the invention. FIG. 13 shows an alternate embodiment in which enterprise communication controller 500 is in direct communication with a PLC via backplane API 522*a*. This configuration may be necessary where enterprise communication controller 500 has a need to communicate with additional devices such as a Radio Frequency Identification (RFID) reader, in which case BP API 522*b* would be different, such as to allow communication with the external device. This configuration will also require multiple tag scanners 524*a* and 524*b* to interface with various devices (PLC and RFID reader).

Figure 14:
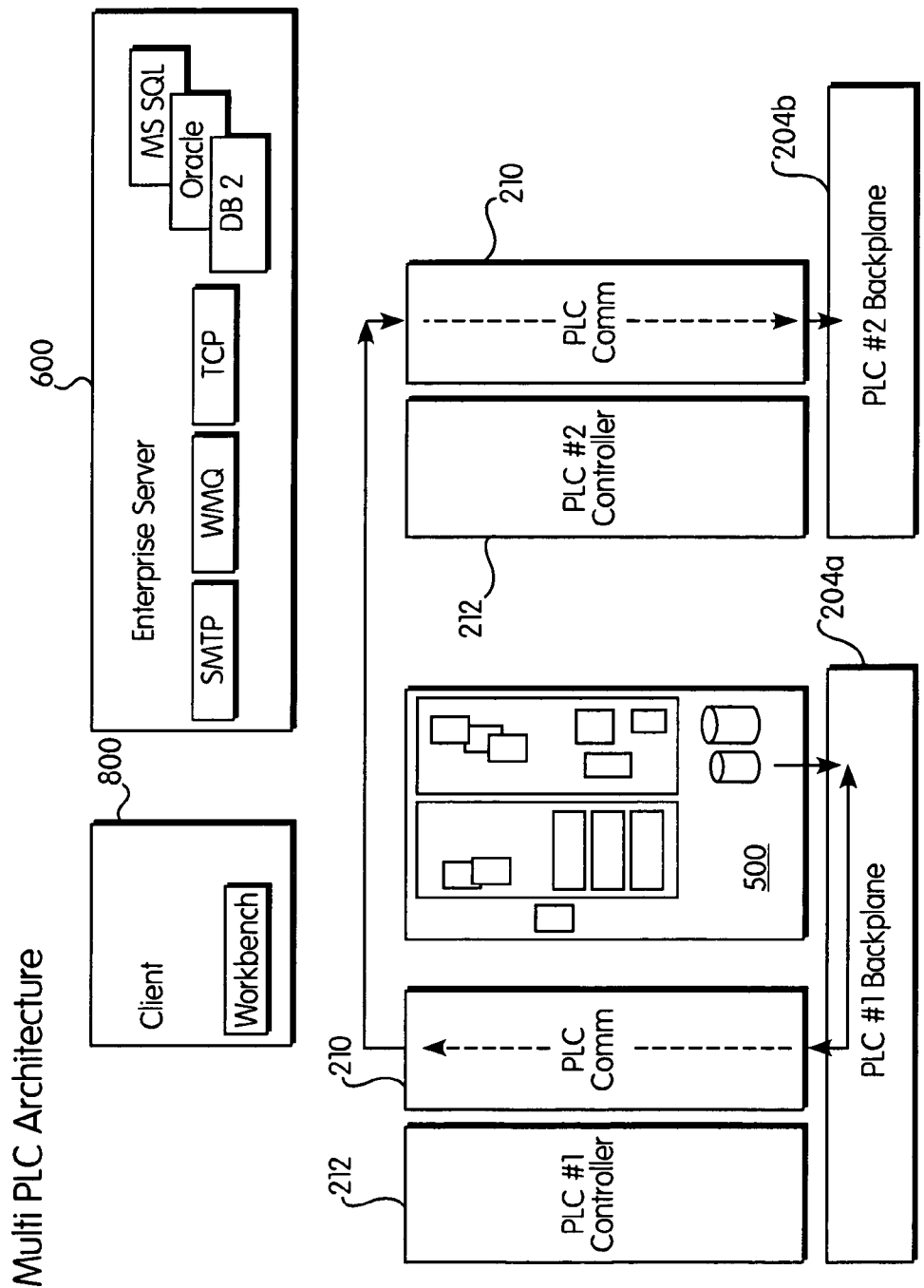
FIG. 14 shows an alternate embodiment for connection to multiple PLCs via the PLC's communications channel.
Figure 15:
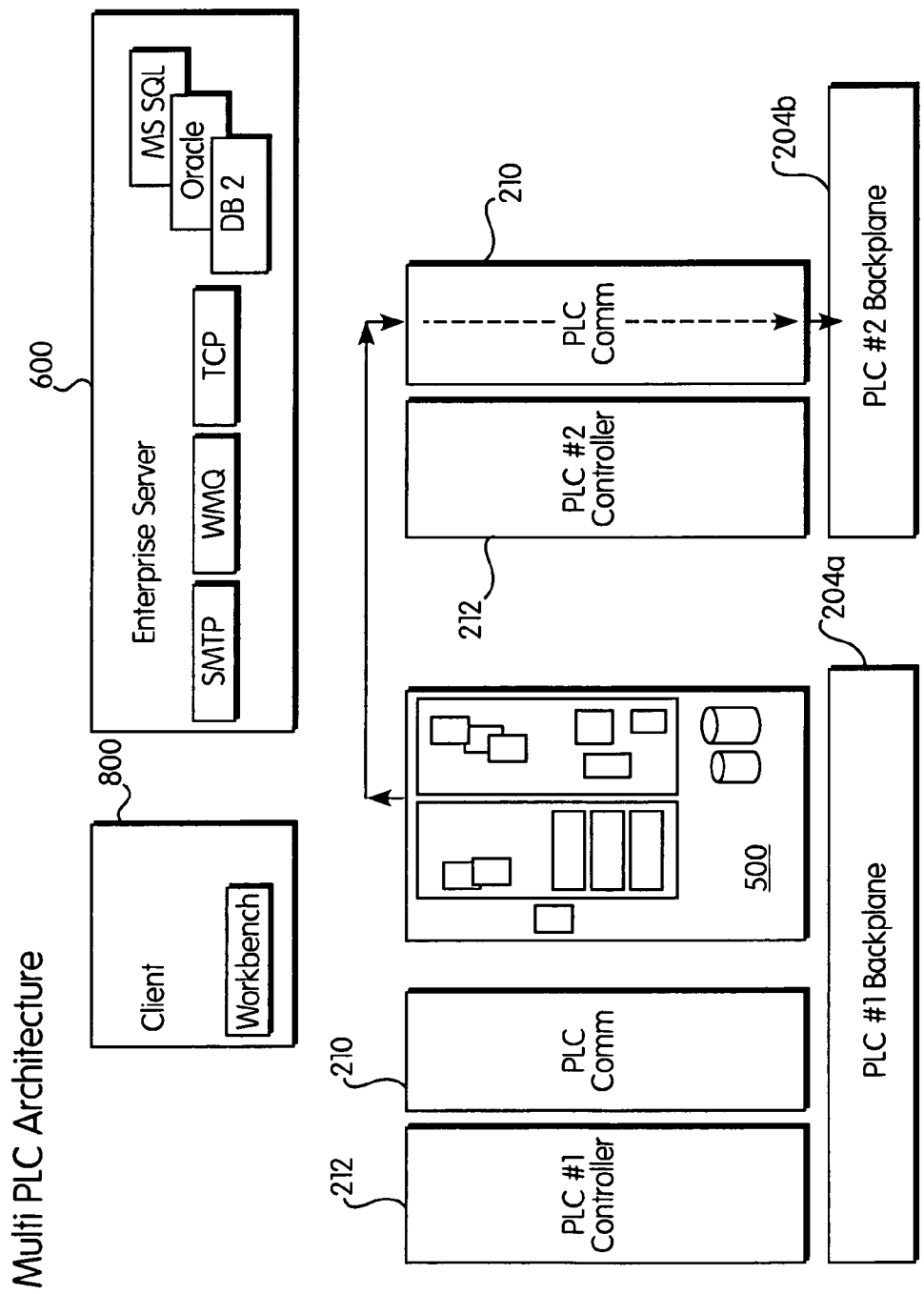
FIG. 15 shows an alternate embodiment for connection to multiple PLCs using a device driver.
Figure 18:
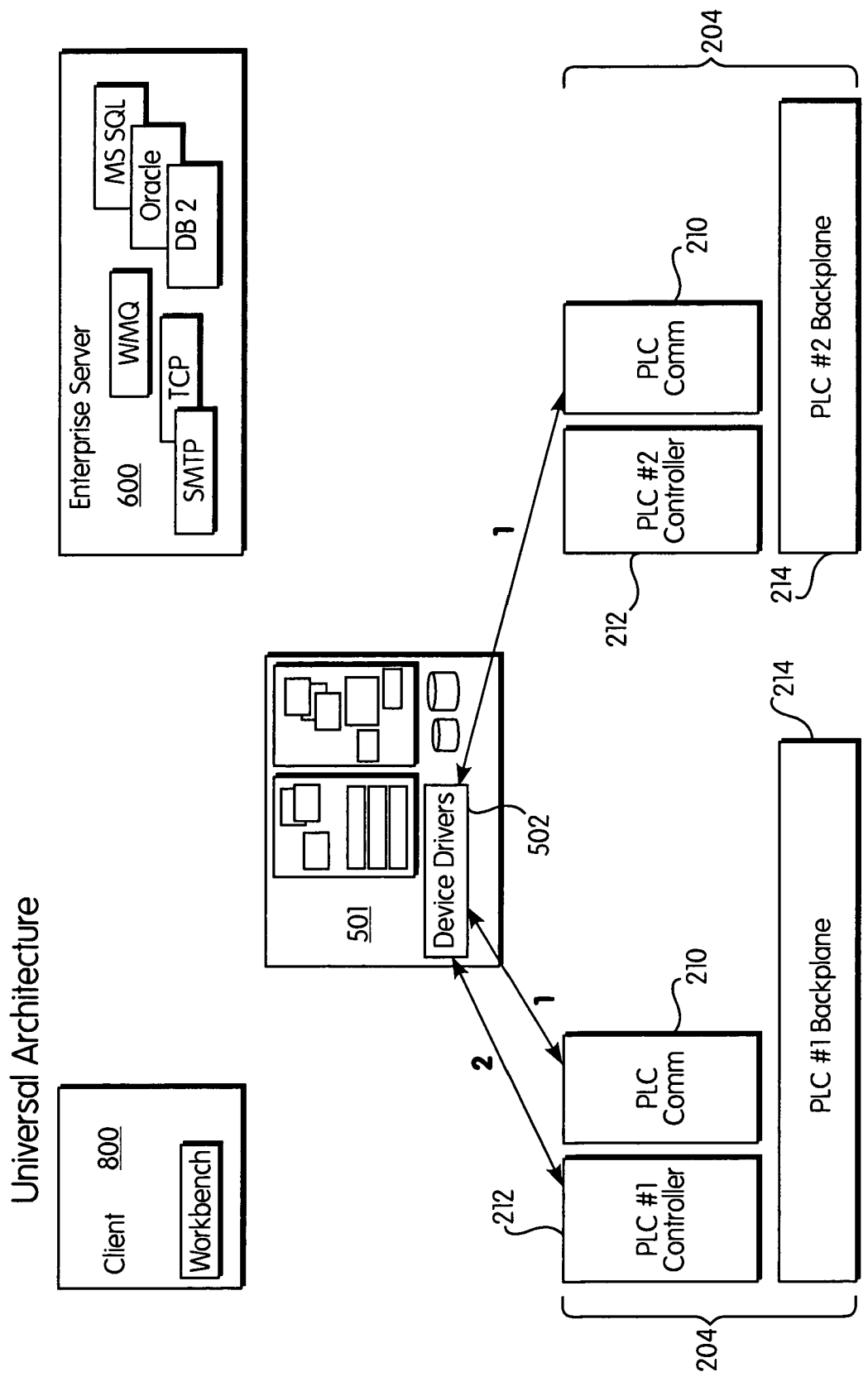
FIG. 18 shows an alternate embodiment wherein a PC with a device driver is used in lieu of the enterprise communication controller

In certain customer configurations, it may be necessary for a single enterprise communication controller 500 to talk to other PLCs with no enterprise communication controller 500 option. This is done with communication to the PLC communication module instead of using the backplane API. There are two versions that this can take, as shown in FIGS. 14 and 15. In FIG. 14, enterprise communication controller is able to interface with PLC 204 *a* in the manner described with respect to the primary embodiment of the invention. To enable communication with an additional PLC 204*b*, PLC 204*a* is coupled to PLC 204*b* via the PLC communications port 210. Enterprise communication controller 500 is then also to interface with PLC 204*b* via this connection. The connections between the communications ports 210 of PLC 204*a* and 204*b* may be, for example, a serial communication via an RS2332 connection or TCP/IP. FIG. 15 shows yet another configuration in which enterprise communication controller is configured with a custom device driver 502, as shown in FIG. 18, and communicated with additional PLC 204*b* via its PLC communications port 210.

In certain plant floor environments, there may be a need for the enterprise system to not only gather data from the floor, but also to send information to the floor. There could be recipe information that is required at the plant floor, or production requests could be altered based on sales. There are two ways to initiate this data transfer from the enterprise level to the PLC level: PLC request or enterprise push.

Figure 16:
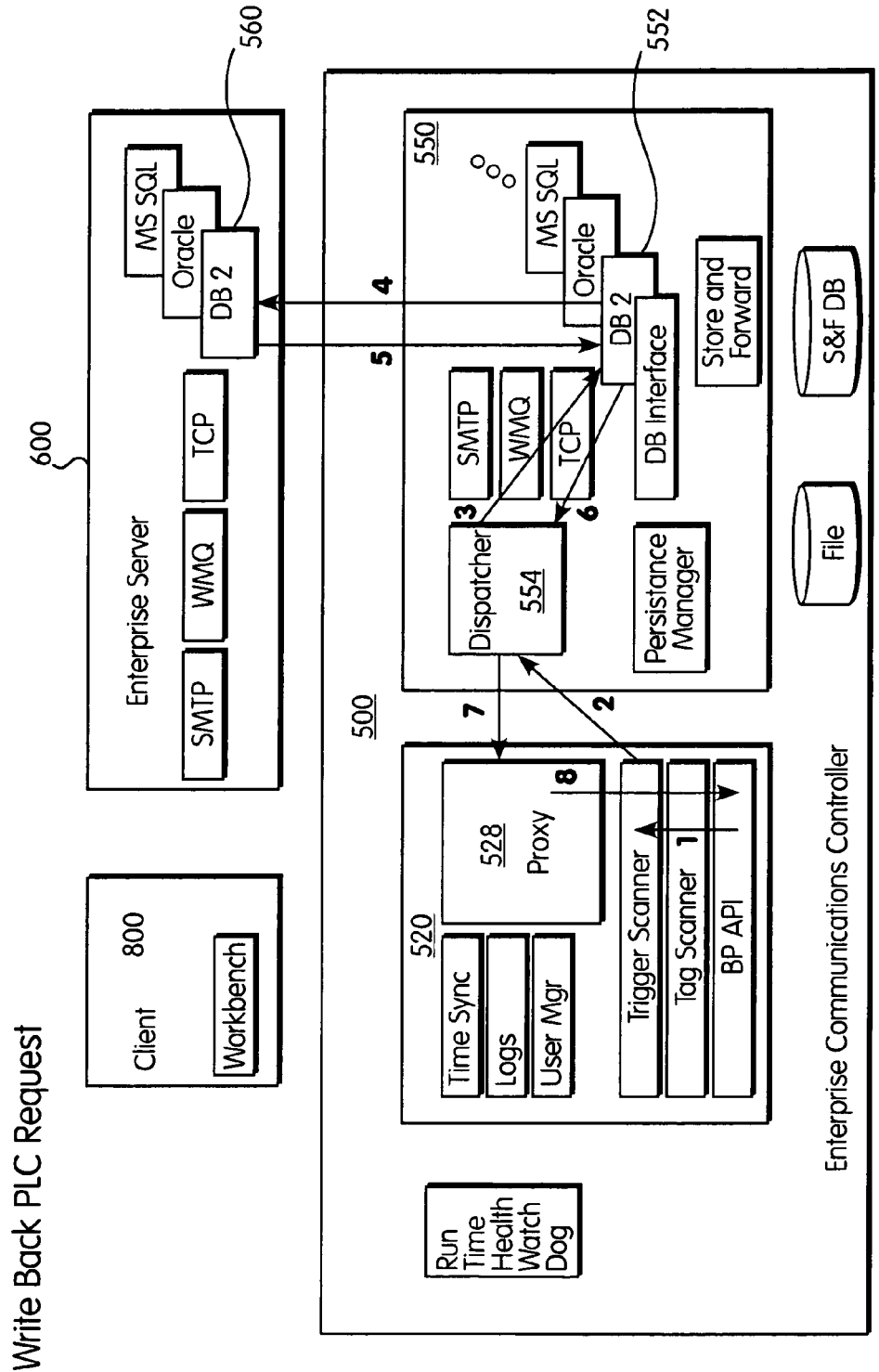
FIG. 16 shows the PLC-requested write back event.

In FIG. 16, there is an unsolicited request from the PLC to retrieve data or, if data changes that would require retrieval of data, trigger scanner 526 receives the request for data via arrow 1. The request is sent to dispatcher 554 via arrow 2. Dispatcher 554 selects the appropriate transport handler to fulfill the request and forwards the information. In this example, the requested information may reside in a database, so the request is sent to database interface 552 via arrow 3. Database interface 552 requests the appropriate information from enterprise database server 560 via arrow 4 and receives the information via arrow 5. The information is sent back to dispatcher 554 via arrow 6 and then to proxy 528 via arrow 7. It is then provided to backplane API 522 via arrow 8 for transport to PLC 204. The information can now be used by PLC 204 for the control process.

Figure 17:
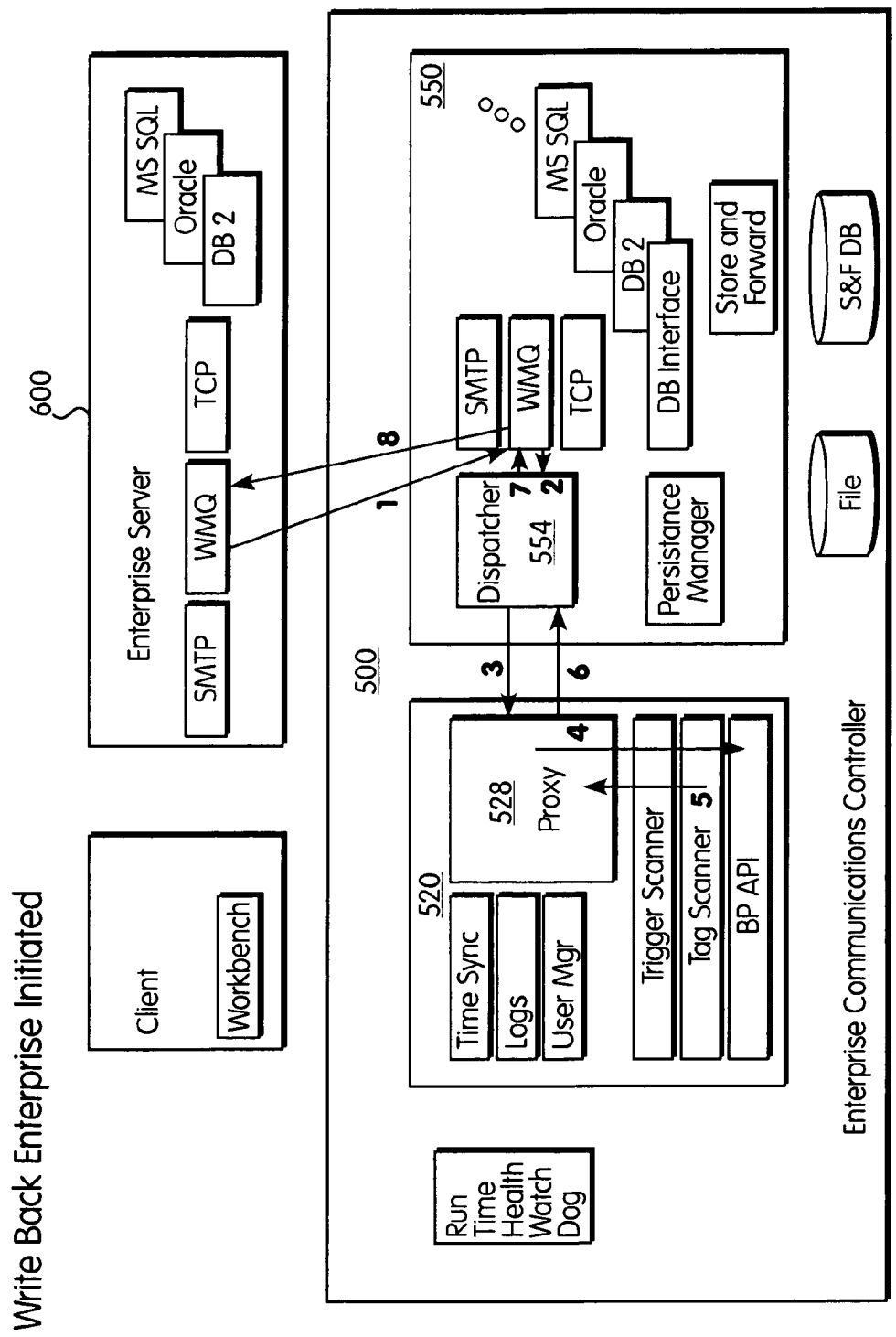
FIG. 17 shows an enterprise requested write back event.

There is also a host initiated write back, shown in FIG. 17, that works the same as the PLC data request. In this case an entity at enterprise level 600 would like to make a change to something on the plant floor. This is done via a message initiated at enterprise level 600 being propagated to PLC 204 and writes of data to one or more tags. The flow of data is identical to that shown in FIG. 16, with the exception that the initial request comes from enterprise server 600 and is sent via message queue manager 811 to transaction server 550.

In an alternate embodiment of the invention, show in FIG. 18, an enterprise communications controller 500 may not be available for a particular type of PLC, or the PLC of interest may not have the capability to communicate via its backplane. In this case, there is an option to modify the primary embodiment of the invention to run on an external PC 501, or "universal enterprise communications controller" (UECC) such that communications with PLC 204 happen through means other than backplane API 522. In this case, a specialized device driver 502 replaces the function of backplane API 522. All other capabilities of this solution are maintained. Device driver 502 can support one of several common plant floor communications mechanisms including serial communication, TCP/IP, Data Highway +, and Profibus. Typically, these connections are made via an Ethernet or RS232 connection between the UECC 501 and PLC communications module 210 via arrow 1. However some PLCs may require connections to their PLC controller 212 via arrow 2. In this embodiment of the invention, UECC 501 may be in communication with multiple PLCs at any given time.

Figure 19:
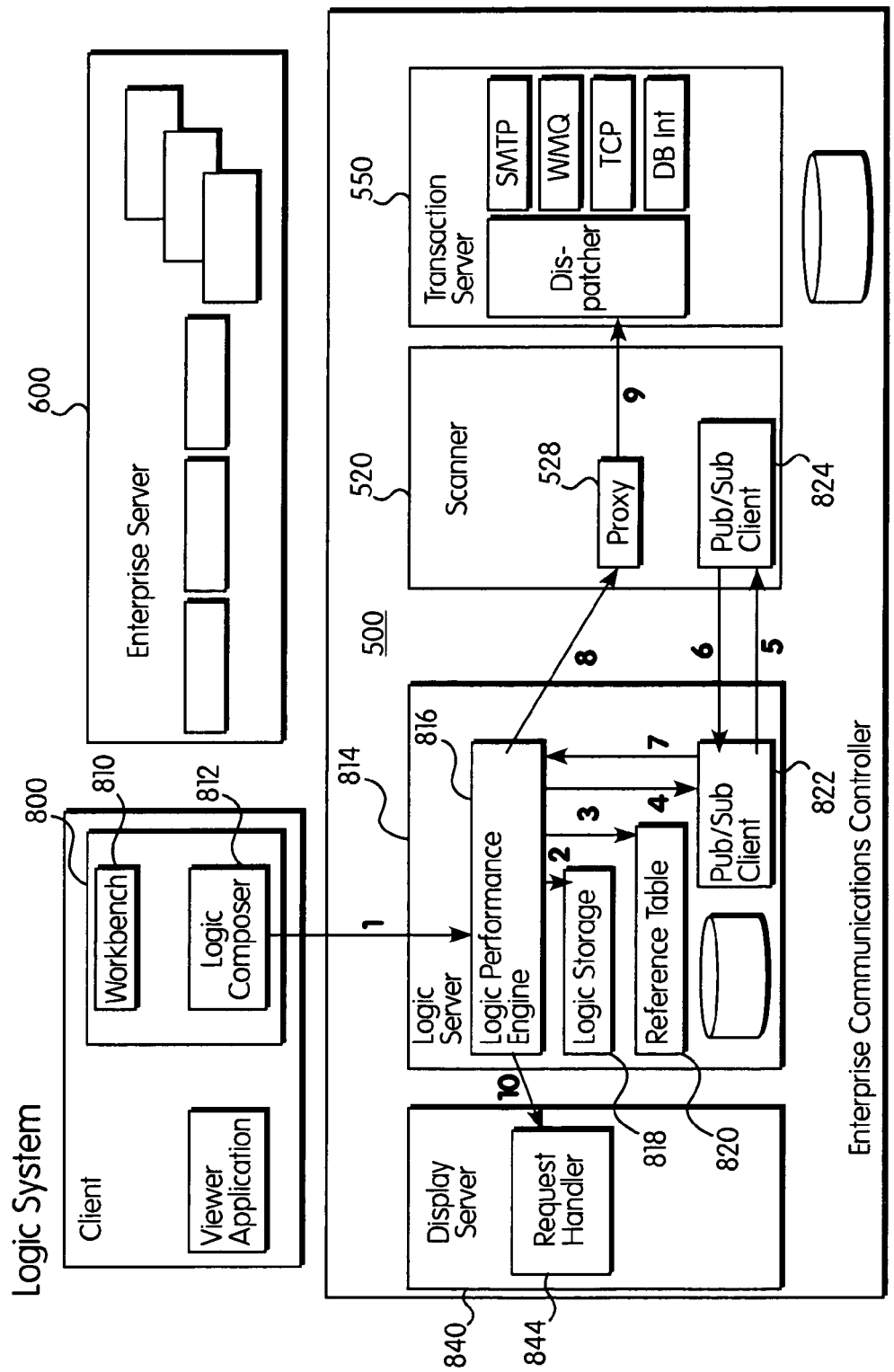
FIG. 19 shows the logic server subsystem of the enterprise communication controller and the logic composed user level application.

An extension of the described architecture is intended to include a logic composer 812, as shown in FIG. 19. Logic composer 812 allows the end user to construct a work flow or logic flow based on a set of "function blocks" which provide a rich set of functions to the end user. These functions may include, for example test clauses, manipulate data, send and receive from any transport, loop through logic areas, request information from enterprise or PLC levels and other workflow items. Logic composer 812 would directly impact each of the existing components and would orchestrate the major activities in the box. It provides a general business logic flow in addition to the other functions already provided. The flow of logic would be constructed at the client and then sent to logic server 814 via arrow 1 for storage and implementation. The logic performance engine 816 portion of logic server 814 will: 1) store the definition in logic storage component 818, via arrow 2; 2) build a list of affected PLC data tags and store that in reference table 820 via arrow 3; and 3) subscribe to the required data via the pub/sub client 822 and pub/sub server 824 via arrows 4 and 5 respectively. As the system runs, logic performance engine 816 will receive data changes via arrows 6 and 7 and then will perform the required business logic or data manipulation. The resulting information can be sent to the required user via one of several options. The updated/derived information can be sent back to PLC 204 by scanner 520 via arrow 8; the updated/derived information can be sent to enterprise server 600 by transaction server 550 via arrow 9; or the updated/derived information can be displayed to the end user by display server 640 via arrow 10.

Figure 20:
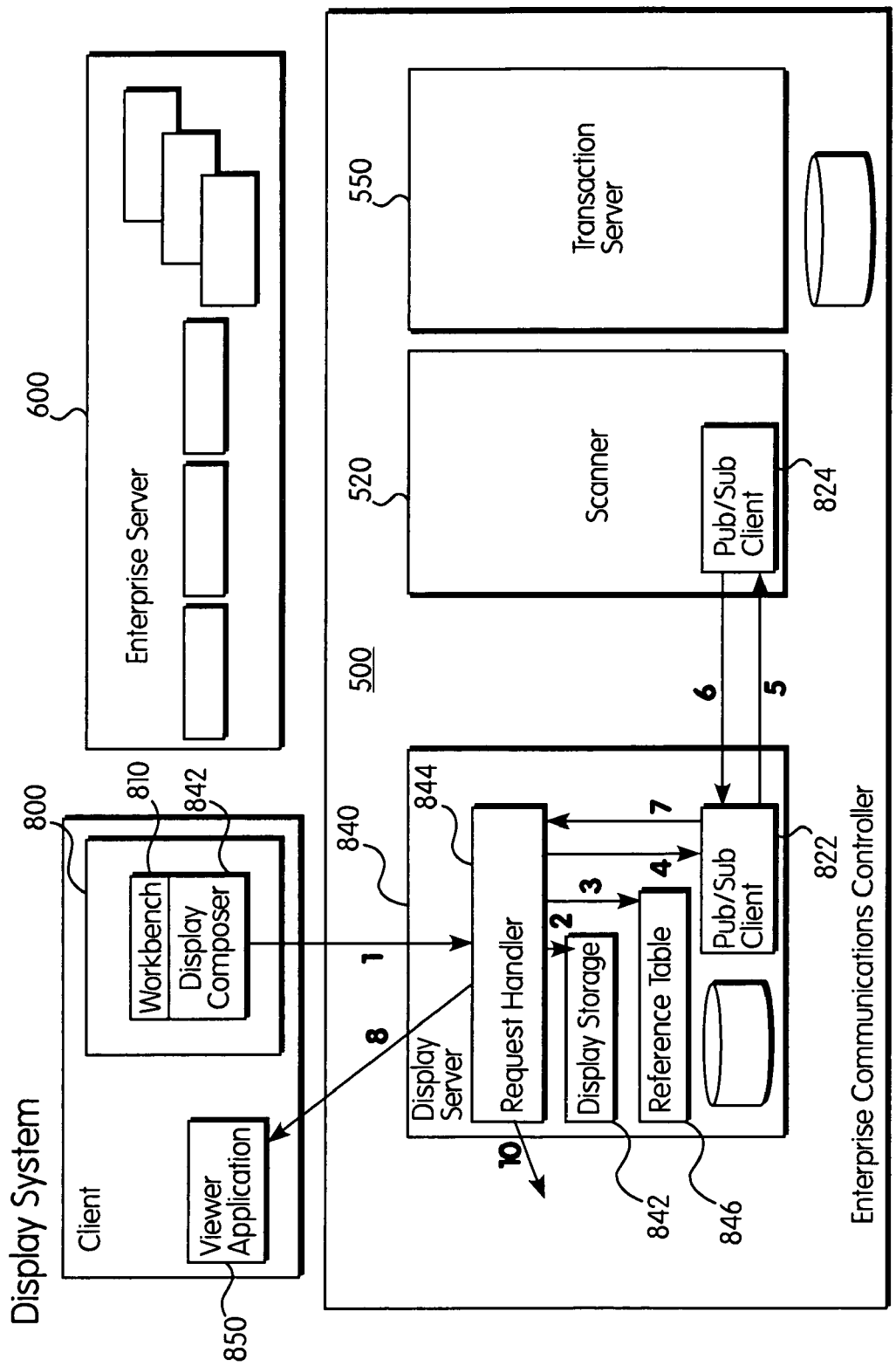
FIG. 20 shows the display server subsystem of the enterprise communication controller and the user level viewer application.

The architecture of the present invention may also include a display subsystem would be comprised of three major components, as shown in FIG. 20: runtime viewer 850 to view data, workbench display composer 842 to define the screens and runtime display server 840 to support screen/data updates and persist the display definitions. In one embodiment of the invention, workbench 810 allows the user to define operations and data/message exchange between the PLC and enterprise server 600. Users also have a need to view data from various clients to be able to define the screens to meet their viewing needs. The display subsystem is a robust tool that allows these definitions to happen within enterprise communications controller 500 and to present this data to any client.

Display composer 842 is an extension to workbench 810 which allows the definition of a screen in which data is to be displayed. This screen may include fill bars, text fields, buttons, warning indicators or other display objects which are linked to data tags in PLC 204. Display composer 842 sends screen definition information to the request handler portion 844 of display server 840 in via arrow 1. Request handler 844 stores the display definition locally in display storage 842, or references a display, which may be stored on a separate central server. Request handler 844 also parses the contents of the display definition and creates a list of PLC data tags which are required to be known to the display and stores this list in reference table 846. Request handler 844 uses the list of PLC data tags to make requests via arrow 4 to pub/sub client 822 to the PLC to be notified of changes in data. Pub/sub client 822 registers these requests via arrow 5 with the pub/sub server 824, which is an enhancement to scanner 520 of the primary embodiment. As tags are updated in the PLC based on plant floor changes, pub/sub server 824 will send changes in status to request handler 844 via pub/sub client 822, arrows 6 and 7. Display information will then be updated and sent to the appropriate viewer via arrow 8. Viewer application 850 in client 800 may be a proprietary viewer, or may be a general commercial Web Browser. Depending on the client, the protocol of arrow 8 may be either a proprietary protocol or standard HTTP or HTTPS.

Figure 21:
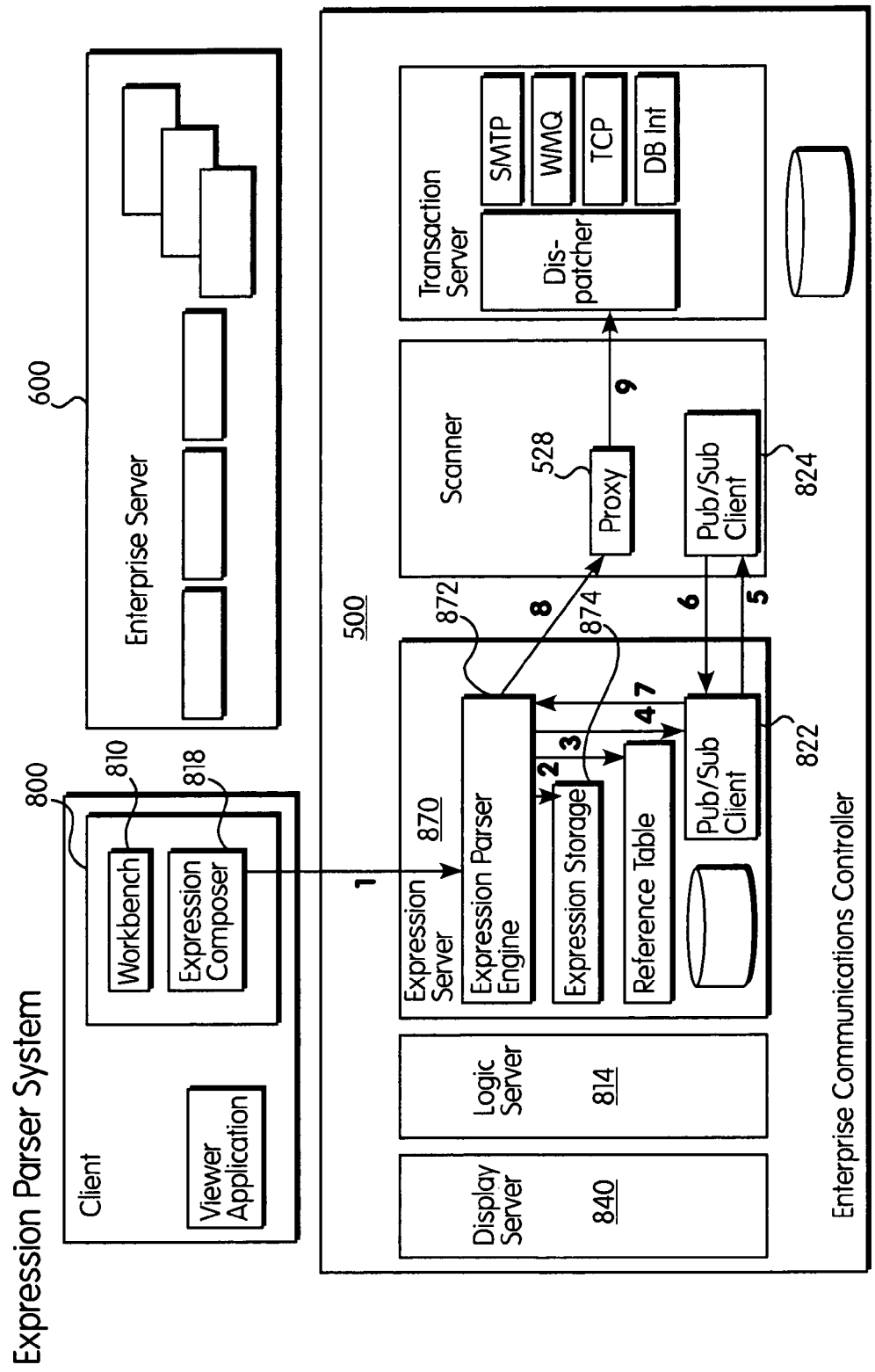
FIG. 21 shows the expression server subsystem of the enterprise communication controller and the user level expression composer application.

An extension of the described architecture is intended to include an expression parser, shown in FIG. 21, which allows the user to do additional manipulation of the data before sending it to enterprise level 600. The current architecture allows the writing of data points or tags, defined on the device, to various output sources. The association of a data point to an output source is made while defining the payload of a trigger. Along with writing these raw data point values, there are times where it may be desirable to write a calculated value to an output source. The input into this calculation would be made up of data point values read from the device, along with constant values defined by the user. This enhancement would allow the user to define mathematical equations, consisting of data point values and constant values as part of the trigger payload. The evaluation of this equation occurs on the device and would use the data point values read at the time the corresponding trigger is fired. This enhancement broadens the data write capabilities to include not only tag values and constant values, but calculated values as well.

Workbench 810, using expression composer 818, allows the user to create a mathematical equation as a data source in the trigger payload. In addition to being able to drag and drop tag values into the payload definition, the user can also drag and drop predefined macro values (timestamps) and user defined macro values (constants) into the trigger payload. Expression composer 818 provides the user the ability to drag formulas into the trigger payload as well. Dropping a formula macro into the trigger payload initiates expression composer 818, which aids the user in the definition of a mathematical expression that is evaluated at runtime on the device. The editor allows the user to enter constant numeric values, along with mathematical operands, from an interface resembling a standard calculator. Additionally, the editor allows the user to drag and drop numeric data points into the equation.

FIG. 21 shows the flow of data for the expression composer feature described above. Expression composer 818 is a user level client application running on client 800 that allows users to graphically compose mathematical and logic expressions. The expression definition is sent via arrow 1 to the expression parser engine 872 within expression server 870. The equation definition is stored locally in expression storage 874. Expression parser 872 parses the expression definition and creates a list of PLC data tags which are required to be known to evaluate the expressions and stores those in reference table 826 via arrow 3. Expression parser 872 uses the list of PLC data tags to make requests, via arrow 4 to publish/subscribe client 822, to the PLC to be notified of any changes in the data in which it is interested. Publish/subscribe client 822 registers these requests via arrow 5 with publish/subscribe server 824 and is informed of any changes of those data items via arrows 6 and 7. The result of the evaluation of the expression can be sent to the users via arrows 8 and 9, in the manner described above for sending messages to enterprise level 600.

The preferred embodiment of the invention has been described herein, however, as should be understood my one of ordinary skill in the art, the scope of the invention is intended to included to equivalents and other implementations which may perform similar functions. The scope of the invention is defined in the claims which follow.

We claim:

1. A system for communicating data to and from a control and monitoring device, said system comprising:
   a controller coupled to and in communication with said control and monitoring device, said controller having a network connection; and
   software installed on said controller;
   wherein said software can read data from said control and monitoring device and receive messages from said control and monitoring device and further wherein said software can configure and send said data and messages to an application at a destination, in a format required by the application, via said network connection for automatic, direct connectivity between the controller and the application at the destination without manual intervention, wherein said software comprises a logic server for tracking changes in said data read from said control and monitoring device and for applying logical manipulations to said data read from said control and monitoring device, and an expression server for evaluating mathematical and/or logic expressions and using data read from said control and monitoring device,
   wherein said data is sent via said network connection upon occurrence of one or more configurable trigger conditions,
   wherein said configuring of said trigger conditions includes selecting information regarding the data to be sent, an event upon which the data is sent, a destination of said data, and the format in which said data is to be sent upon satisfaction of said trigger condition, and
   wherein the system further comprises one or more configuration files contained in non-volatile storage on said controller, said configuration files containing a record of all defined projects, transports and general settings, and further wherein said software can restore itself to a previous state using said configuration files upon recovery from a power fail condition.

2. The system of claim 1 wherein said control and monitoring device is a programmable logic controller (PLC) and further where said data is discrete data points read from said programmable logic controller.

3. The system of claim 2 wherein said one or more trigger conditions are selected from a group consisting of: receipt of an unsolicited message from said PLC, change in a data point read from said PLC, and satisfaction of a logical condition regarding a data point read from said PLC.

4. The system of claim 1 wherein said controller is configurable to define said trigger conditions.

5. The system of claim 2 wherein said software can send said data to a destination via said network connection in response to a request received via said network connection.

6. The system of claim 1 wherein said data is formatted prior to sending it to said destination via said network connection.

7. The system of claim 6 wherein said formatted data can be sent via said network connection using one or more differing protocols, including: TCP, message queues, SMTP and SQL database calls.

8. The system of claim 1 wherein said software can insert said data into a database or update data already residing is a database, said database residing on a computer connected to said controller via said network connection.

9. The system of claim 6 wherein said software can send formatted messages to an application running on a computer connected to said controller via said network connection.

10. The system of claim 2 further comprising a volatile working storage containing a current state of all of referenced discrete data points read from said PLC.

11. The system of claim 6 further comprising a temporary storage area contained in non-volatile storage on said controller, wherein said formatted data is stored when said network connection is unavailable.

12. The system of claim 11 wherein said software can re-send all formatted data stored in said temporary storage area when said network connection becomes available.

13. The system of claim 6 further comprising one or more log files stored on non-volatile storage in said controller, said software making entries into said log files.

14. The system of claim 6 further comprising a user application, running on a computer connected to said controller via said network connection, said user application allowing a user to configure and program said controller.

15. The system of claim 14 wherein said user can create projects consisting of one or more trigger conditions, said projects being downloaded to said software in said controller via said network connection.

16. The system of claim 14 wherein said user can define specific destinations for said data and associate trigger conditions with said specific destinations.

17. The system of claim 16 wherein said specific destinations are selected from a group consisting of: applications running on a computer having a network connection, a database residing on a computer having a network connection and an email address.

18. The system of claim 16 wherein said controller sends said data directly to said specific destination associated with a trigger condition when said trigger condition is met.

19. The system of claim 16 wherein said user can specify the method used to send said data to said specific destination.

20. The system of claim 19 wherein said method is selected from a group consisting of message queues, TCP messages, SQL database calls and SMTP messages.

21. The system of claim 2 wherein said controller and said PLC share a common backplane and further wherein said controller communicates with said PLC via said common backplane.

22. The system of claim 21 wherein said controller shares a common backplane with multiple PLCs and communicates with said multiple PLCs via shared backplanes.

23. The system of claim 21 wherein said PLC is coupled to a second PLC via a communication channel and further wherein said controller can communicate with said second PLC through the PLC with which shares a backplane.

24. The system of claim 23 wherein said communication channel includes a serial connection or a TCP/IP connection.

25. The system of claim 2 wherein said software further comprises a communications device driver, said communications device driver allowing said controller to communicate with a second PLC via a communication channel.

26. The system of claim 25 wherein said communication channel includes a serial connection or a TCP/IP connection.

27. The system of claim 2 wherein the said controller can modify said discrete data points on said PLC.

28. The system of claim 27 wherein said PLC request specific data from said controller, and further wherein said controller may retrieve said data requested by said PLC via said network connection.

29. The system of claim 1 further comprising a user application, running on a computer connected to said controller via said network connection, for configuring said controller, defining said trigger conditions, and defining said destination for said data.

30. The system of claim 2 further comprising a logic composer application, running on a computer connected to said controller via said network connection, for constructing logic flows for said logic server.

31. The system of claim 2 wherein said software further comprises a display server for maintaining and updating user displays connected to said controller via said network connection.

32. The system of claim 31 further comprising a viewer application, running on a computer connected to said controller via said network connection, for viewing said user displays maintained and updated by said display server.

33. The system of claim 2 further comprising an expression composer application running on a computer connected to said controller via said network connection, for constructing said mathematic or logic expressions for said expression server.

34. The system of claim 19 wherein said controller is a PC and wherein said software further comprises a device driver, said device driver allowing said PC to communicate with one or more PLCs via one or more communication channels.

35. The system of claim 34 wherein said one or more communication channels include one of a serial connection or a TCP/IP connection.

36. A system for communicating data to and from a programmable logic controller (PLC), said system comprising:
a controller, coupled to said PLC and in communication therewith, said controller being capable of reading specific data points from said PLC, said controller having a network connection;
a software component installed on said controller for evaluating trigger conditions and configuring and sending one or more of said specific data points read from said PLC to an application at a predefined destination, in a format required by the application, over said network connection when said trigger condition is met, wherein said software component provides for automatic, direct connectivity between the controller and the application at the predefined destination without manual intervention, wherein said software component comprises a logic server for tracking changes in said data read from said PLC and for applying logical manipulations to said data read from said PLC, and an expression server for evaluating mathematical and/or logic expressions and using data read from said PLC; and
a user application, running on a computer connected to said controller via said network connection, for configuring said controller, defining said trigger conditions, and defining said predefined destinations,
wherein said defining of said trigger conditions includes selecting information regarding data to be sent, an event upon which the data is sent, a destination of said data, and the format in which said data is to be sent upon satisfaction of said trigger condition, and
wherein the system further comprises one or more configuration files contained in non-volatile storage on said controller, said configuration files containing a record of all defined projects, transports and general settings, and further wherein said software can restore itself to a previous state using said configuration files upon recovery from a power fail condition.

37. The system of claim 36 wherein said predefined destinations are selected from a group consisting of applications running on a computer having a network connection, a database residing on a computer having a network connection and an email address.

38. The system of claim 36 wherein said controller is plugged into a backplane of said PLC and communicates with said PLC through said backplane.

39. The system of claim 36 wherein said trigger condition is selected from a group consisting of receipt of an unsolicited message from said PLC, change in a data point read from said PLC, and satisfaction of a logical condition regarding a data point read from said PLC.

40. A system for communicating data to and from a control and monitoring device, said system comprising:
a PC coupled to and in communication with one or more of said control and monitoring devices, said PC having a network connection; and
software installed on said PC, said software including a device driver which can read data from said one or more control and monitoring devices and receive messages from said one or more control and monitoring devices and further wherein said software can configure and send said data and messages to an application at a predefined destination, in a format required by the application, via said network connection, wherein said software provides for automatic, direct connectivity between the PC and the application at the predefined destination without manual intervention, wherein said software comprises a logic server for tracking changes in said data read from said one or more control and monitoring devices and for applying logical manipulations to said data read from said one or more control and monitoring devices, and an expression server for evaluating mathematical and/or logic expressions and using data read from said one or more control and monitoring devices,
wherein said data is sent via said network connection upon occurrence of one or more configurable trigger conditions,
wherein said configuring of said trigger conditions includes selecting information regarding the data to be sent, an event upon which the data is sent, a destination of said data, and the format in which said data is to be sent upon satisfaction of said trigger condition, and
wherein the system further comprises one or more configuration files contained in non-volatile storage on said PC, said configuration files containing a record of all defined projects, transports and general settings, and further wherein said software can restore itself to a previous state using said configuration files upon recovery from a power fail condition.

41. The system of claim 40 wherein said one or more control and monitoring devices are programmable logic controllers (PLCs) and further where said data is discrete data points read from said one or more programmable logic controllers.

42. The system of claim 41 wherein said PC is coupled to said one or more PLCs via one or more corresponding communication channels, said communication channels including one of a serial connection or a TCP/IP connection.

43. The system of claim 1 wherein said trigger conditions are configured by a user via either a point-and-click or a drag-and-drop interface without programming.

44. The system of claim 36 wherein said trigger conditions are defined by a user via either a point-and-click or a drag-and-drop interface without programming.

45. The system of claim 40 wherein said trigger conditions are configured by a user via either a point-and-click or a drag-and-drop interface without programming.

* * * * *